United States Patent
Kyotani et al.

(10) Patent No.: US 11,256,211 B2
(45) Date of Patent: Feb. 22, 2022

(54) IMAGE FORMING APPARATUS CAPABLE OF CONTROLLING EXTENSION OF USE OF DRUM CARTRIDGE

(71) Applicant: BROTHER KOGYO KABUSHIKI KAISHA, Nagoya (JP)

(72) Inventors: Tadao Kyotani, Nagoya (JP); Chieko Mimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/159,804

(22) Filed: Jan. 27, 2021

(65) Prior Publication Data
US 2021/0232089 A1    Jul. 29, 2021

(30) Foreign Application Priority Data
Jan. 29, 2020  (JP) .............................. JP2020-012876

(51) Int. Cl.
*G03G 21/18* (2006.01)
*G06F 3/12* (2006.01)

(52) U.S. Cl.
CPC ..... *G03G 21/1882* (2013.01); *G03G 21/1896* (2013.01); *G06F 3/121* (2013.01);
(Continued)

(58) Field of Classification Search
CPC ........... G03G 21/1882; G03G 21/1896; G03G 2221/1892; G03G 2221/1663;
(Continued)

(56) References Cited

U.S. PATENT DOCUMENTS 4,974,238 A * 11/1990 Kobayashi ........... G03G 15/553
377/13
7,031,623 B2 * 4/2006 Haramoto ............ G03G 15/553
399/12

(Continued)

FOREIGN PATENT DOCUMENTS

JP    2008-257081 A    10/2008
JP    2009-244892 A    10/2009
(Continued)

OTHER PUBLICATIONS

International Search Report and Written Opinion issued in corresponding International Patent Application No. PCT/JP2021/002619, dated Mar. 23, 2021.

*Primary Examiner* — Ryan D Walsh
(74) *Attorney, Agent, or Firm* — Merchant & Gould P.C.

(57) ABSTRACT

An image forming apparatus includes an apparatus body, a toner cartridge, a replaceable part, a controller and an apparatus body memory. An operating mode of the controller is set to one of a subscription mode and a normal mode. The controller is configured to perform processes in accordance with the set operating mode. The apparatus body memory is configured to store life information indicating a remaining life of the replaceable part attached to the apparatus body. The controller is configured to switch a control between: a control for allowing an extended use of the replaceable part; and a control for restricting the extended use of the replaceable part, according to the set operating mode. The extended use is defined as use of the replaceable part even after the replaceable part exceeds the remaining life indicated by the life information stored in the apparatus body memory.

20 Claims, 18 Drawing Sheets

(52) U.S. Cl.
CPC .......... *G06F 3/1219* (2013.01); *G06F 3/1229* (2013.01); *G06F 3/1235* (2013.01); *G06F 3/1239* (2013.01); *G06F 3/1285* (2013.01); *G03G 2221/1663* (2013.01); *G03G 2221/1892* (2013.01)

(58) Field of Classification Search
CPC ...... G06F 3/121; G06F 3/1285; G06F 3/1235; G06F 3/1219; G06F 3/1239; G06F 3/1229
See application file for complete search history.

(56) References Cited

U.S. PATENT DOCUMENTS

| | | | |
|---|---|---|---|
| 7,831,156 B2* | 11/2010 | Igarashi | G03G 15/55 399/24 |
| 9,137,409 B2* | 9/2015 | Hayakawa | G03G 15/0863 |
| 9,836,253 B2* | 12/2017 | Tomono | G06F 3/1235 |
| 2002/0172520 A1* | 11/2002 | Suyehira | G03G 15/556 399/24 |
| 2009/0028582 A1 | 1/2009 | Okamura et al. | |
| 2012/0014700 A1* | 1/2012 | Matsumoto | G03G 15/5079 399/12 |
| 2012/0250064 A1* | 10/2012 | Wood | G03G 15/0863 358/1.14 |
| 2014/0186061 A1 | 7/2014 | Hayakawa et al. | |
| 2015/0370518 A1* | 12/2015 | Ramchandran | G06F 3/1219 358/1.15 |
| 2018/0275583 A1 | 9/2018 | Kawai | |
| 2020/0064767 A1* | 2/2020 | Daque | G06F 3/1235 |
| 2021/0232086 A1* | 7/2021 | Kyotani | G03G 21/1671 |
| 2021/0252869 A1* | 8/2021 | Kishimoto | B41J 2/17523 |

FOREIGN PATENT DOCUMENTS

| | | |
|---|---|---|
| JP | 2014-77856 A | 5/2014 |
| JP | 2020-112718 A | 7/2020 |

\* cited by examiner

FIG. 8

| OPERATING MODE | DRUM TYPE ||
| --- | --- | --- |
| | NORMAL DRUM | LOW-COST DRUM |
| NORMAL MODE | ALLOW EXTENDED USE | UNUSABLE |
| LOW-COST SUBSCRIPTION MODE | ALLOW EXTENDED USE | ALLOW EXTENDED USE |
| HIGH-COST SUBSCRIPTION MODE | ALLOW EXTENDED USE | RESTRICT EXTENDED USE |

FIG. 16

| OPERATING MODE | DRUM TYPE | |
| --- | --- | --- |
| | NORMAL DRUM | LOW-COST DRUM |
| NORMAL MODE | ALLOW EXTENDED USE | UNUSABLE |
| LOW-COST SUBSCRIPTION MODE | ALLOW EXTENDED USE | ALLOW EXTENDED USE |
| HIGH-COST SUBSCRIPTION MODE | RESTRICT EXTENDED USE | RESTRICT EXTENDED USE |

IMAGE FORMING APPARATUS CAPABLE OF CONTROLLING EXTENSION OF USE OF DRUM CARTRIDGE

CROSS REFERENCE TO RELATED APPLICATION

This application claims priority from Japanese Patent Application No. 2020-012876 filed Jan. 29, 2020. The entire content of the priority application is incorporated herein by reference.

TECHNICAL FIELD

The present disclosure relates to an image forming apparatus, an image forming system, a method for controlling the image forming apparatus, and a non-transitory storage medium storing a set of program instructions installed on and executed by a computer for controlling the image forming apparatus.

BACKGROUND

Prior art describes an image forming apparatus that accepts the mounting of regular toner cartridges and low-cost toner cartridges. This conventional image forming apparatus operates in a first state or a second state. In the first state, the image forming apparatus can use regular toner cartridges but restricts use of low-cost toner cartridges. In the second state, the image forming apparatus can use both of regular toner cartridges or low-cost toner cartridges.

SUMMARY

Replaceable parts that are used together with the toner cartridges for image formation may also be mounted in the image forming apparatus. The replaceable parts may include a drum cartridge having a photosensitive drum. Unlike consumables such as toner cartridges, replaceable parts can be used for a longer period and do not abruptly become unusable upon exceeding their expected life. Consequently, users may continue using, rather than replacing, a replaceable part after the part has reached the end of operational life. However, the quality of image formation may decline when using a replaceable part past its expected life. Since this is not desirable for users expecting high-quality image formation, a method of effective control is needed for controlling the prolonged use of a replaceable part exceeding its expected life.

In view of the foregoing, it is an object of the present invention to provide a technique of effective control for controlling the prolonged usage of replaceable parts in an image forming apparatus when usage of a replaceable part exceeds the estimated life of the part.

According to one aspect, the disclosure provides an image forming apparatus including an apparatus body, a toner cartridge, a replaceable part, a controller and an apparatus body memory. The toner cartridge is detachably attachable to the apparatus body. The replaceable part is detachably attachable to the apparatus body and for use with the toner cartridge in an image-formation. An operating mode of the controller is set to one of a subscription mode and a normal mode. The controller is configured to perform processes in accordance with the set operating mode. The apparatus body memory is configured to store life information indicating a remaining life of the replaceable part attached to the apparatus body. The controller is configured to switch a control between: a control for allowing an extended use of the replaceable part; and a control for restricting the extended use of the replaceable part, according to the set operating mode. The extended use is defined as use of the replaceable part even after the replaceable part exceeds the remaining life indicated by the life information stored in the apparatus body memory.

According to another aspect, the disclosure provides an image forming apparatus including an apparatus body, a toner cartridge, a replaceable part, a controller and an apparatus body memory. The toner cartridge is detachably attachable to the apparatus body. The replaceable part is detachably attachable to the apparatus body and for use with the toner cartridge in an image-formation. The replaceable part includes a replaceable part memory storing therein replaceable part type information indicating one of a subscribed replaceable part and a normal replaceable part. The apparatus body memory stores life information indicating remaining life of the replaceable part attached to the apparatus body. The controller is configured to switch a control between: a control for allowing an extended use of the replaceable part; and a control for restricting the extended use of the replaceable part, according to the replaceable part type information. The extended use is defined as use of the replaceable part even after the replaceable part exceeds the remaining life indicated by the life information stored in the apparatus body memory.

According to still another aspect, the disclosure provides an image forming system including an image forming apparatus, a communication device. The communication device is configured to communicate with the image forming apparatus via a network. The image forming apparatus includes an apparatus body, a toner cartridge, a replaceable part, a controller, and an apparatus body memory. The toner cartridge is detachably attachable to the apparatus body. The replaceable part is detachably attachable to the apparatus body and for use with the toner cartridge in an image-formation. An operating mode of the controller is set to one of a subscription mode and a normal mode. The controller is configured to perform processes in accordance with the set operating mode. The apparatus body memory is configured to store life information indicating a remaining life of the replaceable part attached to the apparatus body. The controller is configured to switch a control between: a control for allowing an extended use of the replaceable part; and a control for restricting the extended use of the replaceable part, according to the set operating mode. The extended use is defined as use of the replaceable part even after the replaceable part exceeds the remaining life indicated by the life information stored in the apparatus body memory. In a case where the controller restricts the extended use of the replaceable part, the controller is configured to transmit order information to the communication device to order a new replaceable part based on the life information.

According to still another aspect, the disclosure provides a method controlling an image forming apparatus. The image forming apparatus includes a toner cartridge and a replaceable part for use with the toner cartridge in an image-formation. An operating mode of the image forming apparatus is set to one of a subscription mode and a normal mode. The method including: storing, in an apparatus body memory, life information indicating remaining life of the replaceable part attached to the apparatus body; and switching a control between: a control for allowing an extended use of the replaceable part; and a control for restricting the extended use of the replaceable part, according to the set operating mode. The extended use is defined as use of the replaceable part even after the replaceable part exceeds the remaining life indicated by the life information stored in the apparatus body memory.

According to still another aspect, the disclosure provides a method for controlling an image forming apparatus. The image forming apparatus including a toner cartridge and a replaceable part for use with the toner cartridge in an image-formation. Replaceable part type information is previously assigned to the replaceable part. The replaceable part type information indicates one of a subscribed replaceable part and a normal replaceable part. The method including: storing, in an apparatus body memory, life information indicating remaining life of the replaceable part attached to the apparatus body; and switching a control between: a control for allowing an extended use of the replaceable part; and a control for restricting the extended use of the replaceable part, according to the replaceable part type information. The extended use is defined as use of the replaceable part even after the replaceable part exceeds the remaining life indicated by the life information stored in the apparatus body memory.

According to still another aspect, the disclosure provides a non-transitory storage medium storing a set of program instructions installed on and executed by a computer for controlling an image forming apparatus. An operating mode of the image forming apparatus is set to one of a subscription mode and a normal mode. The set of program instructions including: storing, in an apparatus body memory, life information indicating remaining life of the replaceable part attached to the apparatus body; switching a control between: a control for allowing an extended use of the replaceable part; and a control for restricting the extended use of the replaceable part, according to the set operating mode. The extended use is defined as use of the replaceable part even after the replaceable part exceeds the remaining life indicated by the life information stored in the apparatus body memory.

According to still another aspect, the disclosure provides a non-transitory storage medium storing a set of program instructions installed on and executed by a computer for controlling an image forming apparatus. Replaceable part type information is previously assigned to the replaceable part. The replaceable part type information indicates one of a subscribed replaceable part and a normal replaceable part. The set of program instructions including: storing, in an apparatus body memory, life information which indicating remaining life of the replaceable part attached to the apparatus body; and switching a control between: a control for allowing an extended use of the replaceable part; and a control for restricting the extended use of the replaceable part, according to the replaceable part type information. The extended use is defined as use of the replaceable part even after the replaceable part exceeds the remaining life indicated by the life information stored in the apparatus body memory.

BRIEF DESCRIPTION OF THE DRAWINGS

The particular features and advantages of the disclosure will become apparent from the following description taken in connection with the accompanying drawings, in which:

FIG. 8 is a table showing details of control stipulated for drum cartridges based on the operating mode of the image forming apparatus and drum type information;

FIG. 16 is a table showing details of control stipulated for drum cartridges based on the operating mode of the image forming apparatus and the drum type information according to a third embodiment;

DETAILED DESCRIPTION

Figure 1:
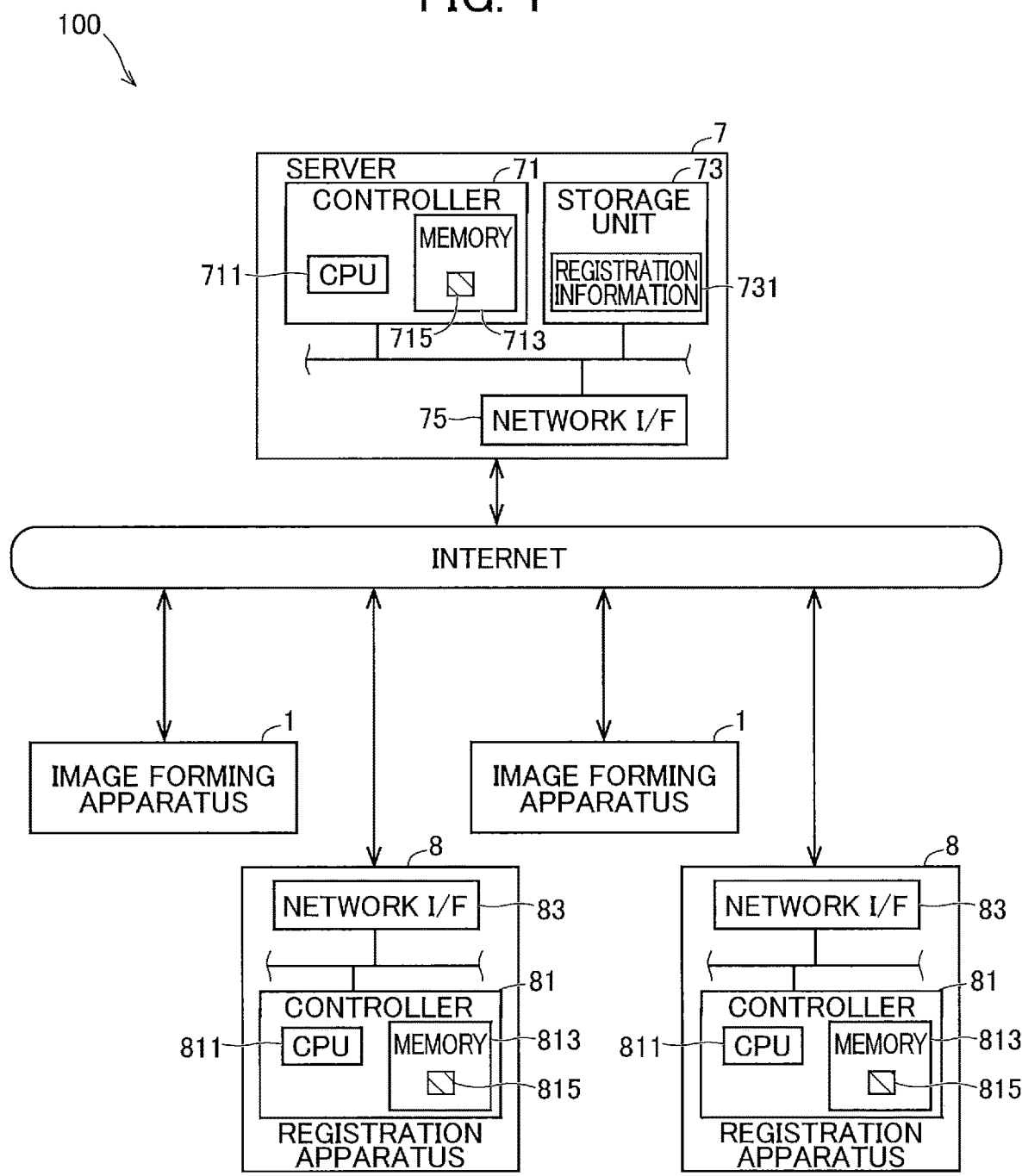
FIG. 1 is a schematic diagram illustrating an image forming system according to a first embodiment of the present disclosure.

Hereinafter, embodiments of the present disclosure will be described while referring to the accompanying drawings. Further, parts and components described in the embodiments are merely exemplary, the parts and components according to the embodiments should not be considered to limit the present disclosure. In the drawings, for easy understanding, the dimensions and numbers of each part may be simplified as necessary.

1. First Embodiment

FIG. 1 is a schematic diagram illustrating an image forming system 100. The image forming system 100 includes image forming apparatuses 1, a server 7, and registration apparatuses 8. Each of the image forming apparatus 1 is communicably connected with the server 7 via internet. As illustrated in FIG. 1, the server 7 can communicate with a plurality of image forming apparatus 1 via internet. Further, the server 7 and the registration apparatuses 8 are communicably connected with each other.

In the image forming system 100, a user of the image forming apparatus 1 enters an agreement with the supplier of the image forming apparatus 1 or of supplies used in the image forming apparatus 1 (e.g., a toner cartridge 30 and a drum cartridge 20). This agreement sets forth printing fees that the user must pay for using the supplies, for example. Specifically, fee may be established based on the number of pages printed; the quantity of toner used in each color; whether the printing mode is monochrome, color, or the like; the printing resolution; or the size of the printing paper. To calculate fee, a flat-rate system or a measured-rate system may be used. In a flat-rate system, the user pays a fixed rate to print a preset number of pages over a prescribed time period (one month, for example). In a measured-rate system, the user pays a fee based on the printing quantity. Alternatively, the user may pay a flat rate up to a preset printing quantity but, when exceeding the preset printing quantity, be required to pay a surcharge that corresponds to the excess quantity. In the following description, a user that has entered an agreement with a supplier will be called a "contracted user" and a user that has not entered a contract will be called a "normal user."

The server 7 is a device that performs management of information related to the contracted user, management of charge and payment, and management regarding the provision of service to the contracted user. Service provided to the contracted user includes a service for shipping supplies to the contracted user. The server 7 has a control unit 71, a storage unit 73, and a network interface 75. The control unit 71 is electrically connected to the storage unit 73 and network interface 75 by bus lines.

The control unit 71 has a CPU 711, and a memory 713. The memory 713 is a storage medium that allows reading and writing of information, such as flash ROM or EEPROM. The memory 713 stores a program 715. The control unit 71 executes various processes with the CPU 711 performing operations according to the program 715. The storage unit 73 is a hard disk drive or other storage device. The storage unit 73 stores registration information 731. The registration information 731 includes information related to the contracted user, information related to image forming apparatus 1 registered by the contracted user, and payment information (information on a credit card, a bank account, etc.).

The registration apparatuses 8 are information terminals used for registering various information. Specifically, each registration apparatus 8 may be a portable device such as a smartphone or tablet computer owned by a user intending to enter a contract with the supplier, a computer connected to the image forming apparatus 1 via a cable, or an information terminal operated by the supplier or the like.

Each registration apparatus 8 has a control unit 81, and a network interface 83. The control unit 81 is connected to the network interface via bus lines or the like. The control unit 81 has a CPU 811, and a memory 813. The memory 813 is a storage medium that allows reading and writing of information, such as flash ROM or EEPROM. The 831 stores a program 815. The control unit 81 executes various processes with the CPU 811 operating according to the program 815. The program 815 includes application software for instructing the control unit 81 to implement processes to exchange various information with the server 7.

<Configuration of Image Forming Apparatus 1>

Figure 2:
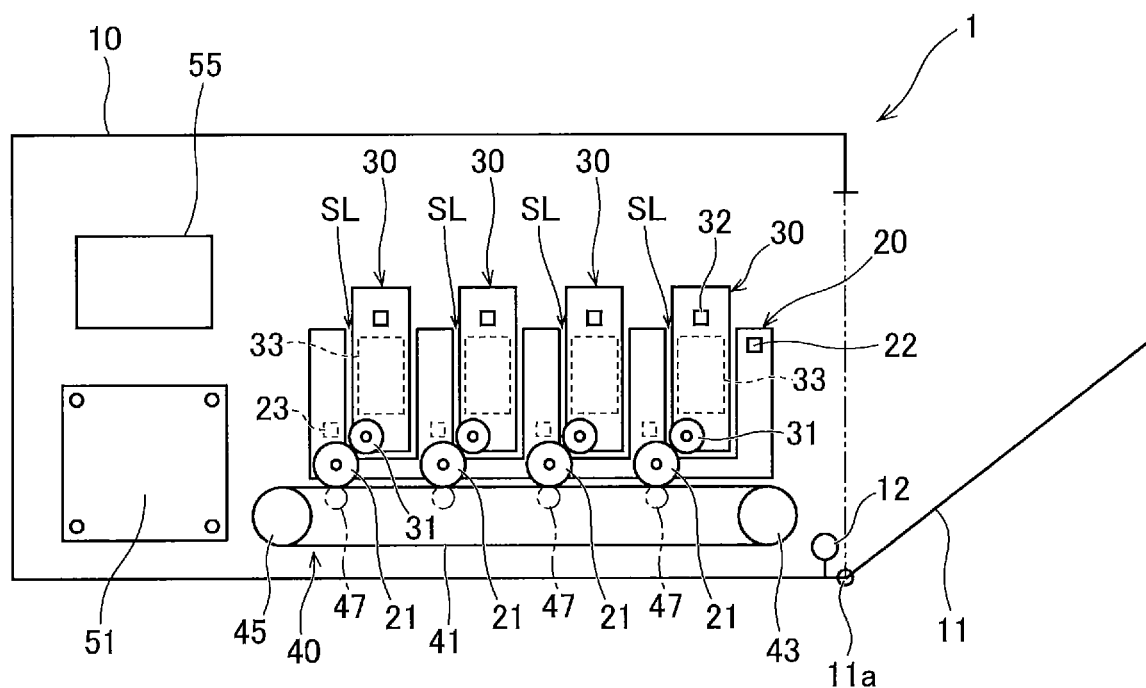
FIG. 2 is a schematic diagram illustrating an image forming apparatus according to the first embodiment.
Figure 3:
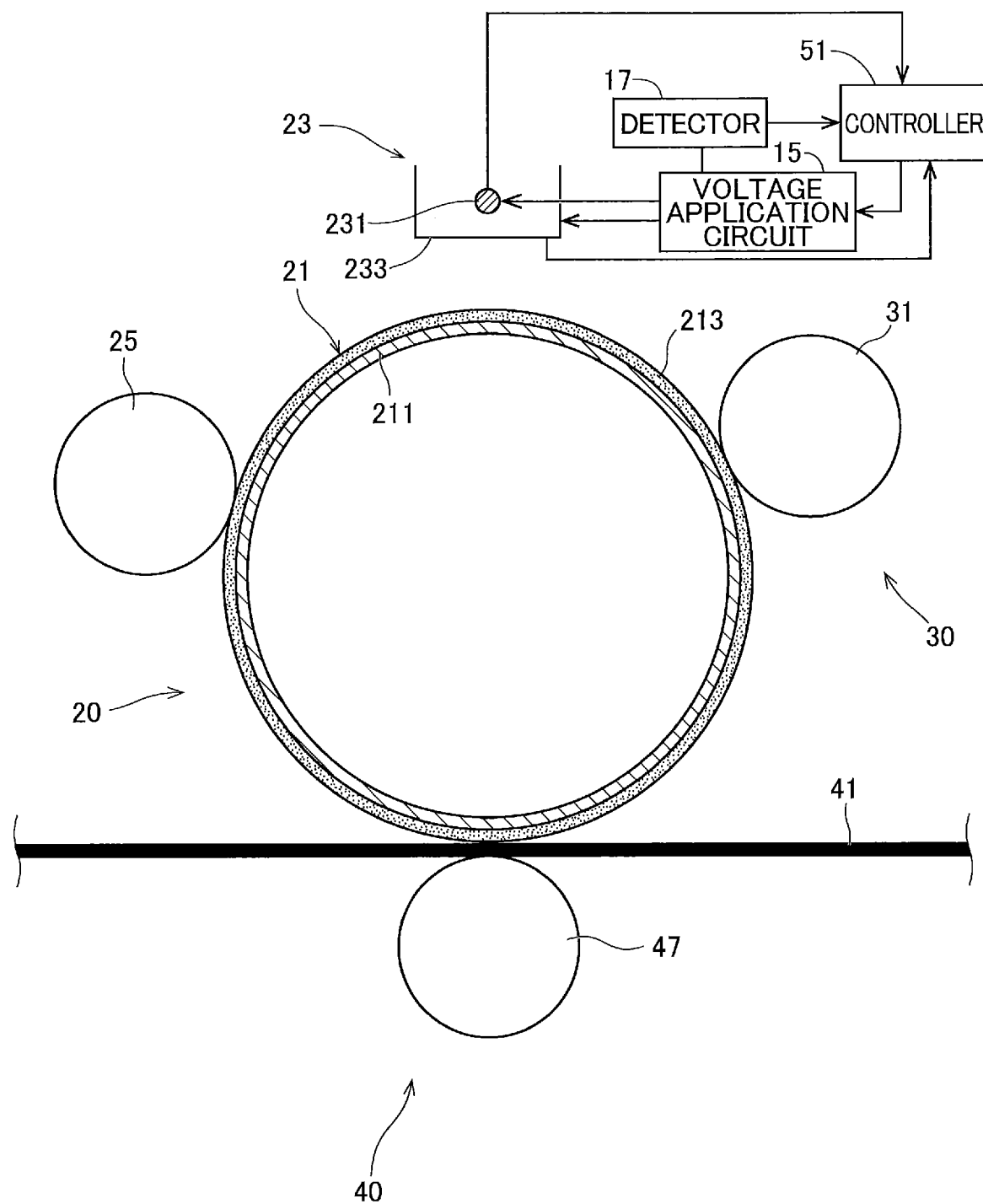
FIG. 3 is a cross-sectional schematic diagram illustrating a photosensitive drum and components in the vicinity thereof according to the first embodiment.
Figure 4:
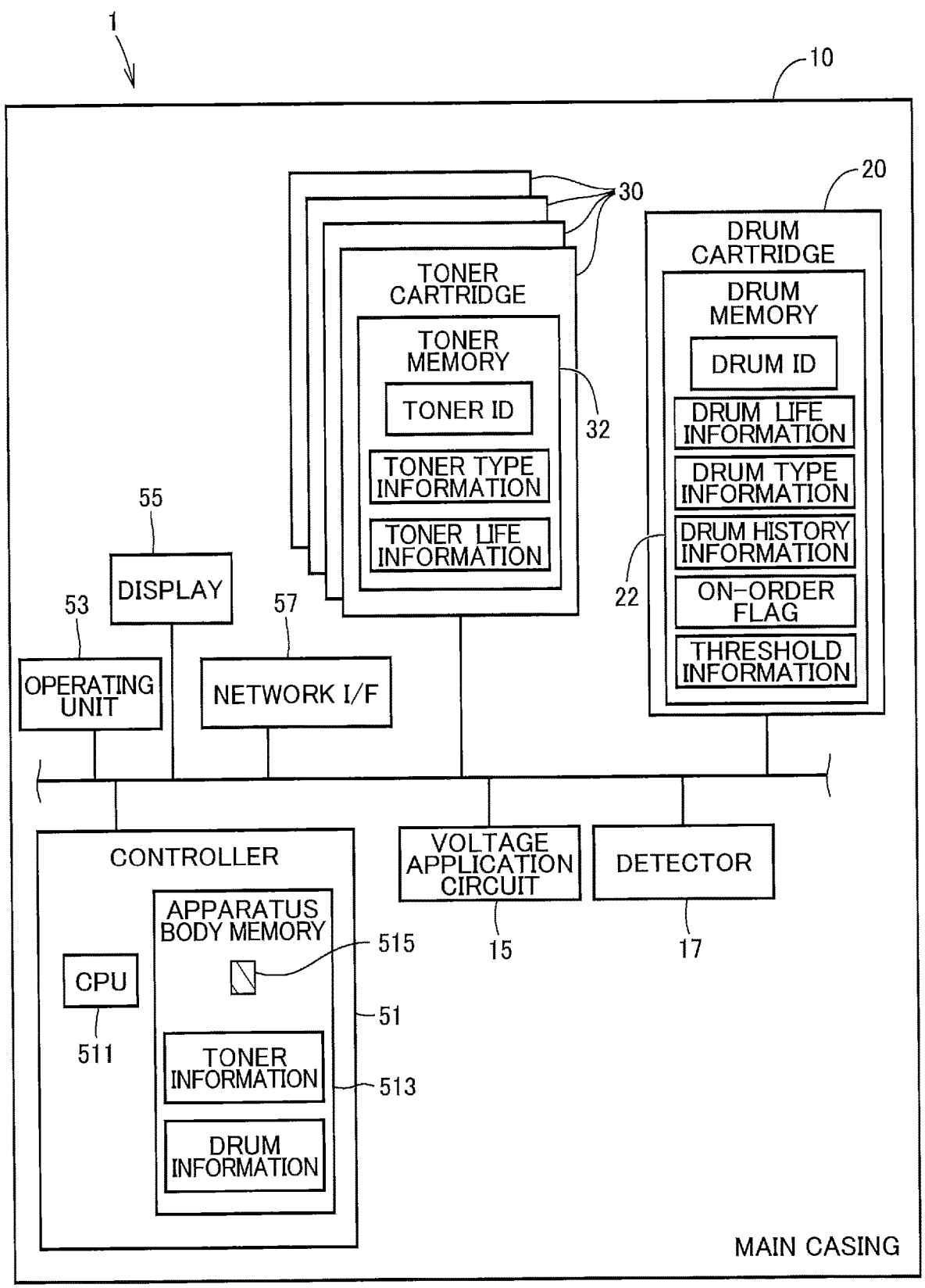
FIG. 4 is a diagram illustrating electrical connections between a controller and the other components according to the image forming apparatus of the first embodiment.

FIG. 2 is a schematic diagram illustrating the image forming apparatus 1 according to the first embodiment. FIG. 3 is a cross-sectional schematic diagram illustrating the photosensitive drum 21 and components in the vicinity thereof according to the first embodiment. FIG. 4 is a diagram illustrating electrical connections between the controller 51 and the other components according to the image forming apparatus 1 of the first embodiment.

As illustrated in FIG. 2, the image forming apparatus 1 includes a main casing 10, a cover 11, the drum cartridge 20, four toner cartridges 30, four light source units (not shown), a transfer unit, a controller 51, and a display 55.

The main casing 10 has a rectangular box shape. The drum cartridge 20, four toner cartridges 30, transfer unit 40, and controller 51 are accommodated in the main casing 10. The drum cartridge 20, four toner cartridges 30, and transfer unit 40 are replaceably mounted in the main casing 10. The display 55 is positioned on the outer surface of the main casing 10. The main casing 10 has a frame for retaining the drum cartridge 20.

The cover 11 can rotate about a rotational shaft 11a along a first direction. The cover 11 can rotate between an open position depicted by solid lines in FIG. 2, and a closed position depicted with two-dot chain lines. The cover 11 is disposed over an opening formed in the side of the main casing 10. The opening in the main casing 10 is exposed when the cover 11 is in the open position and is covered by the cover 11 when the cover 11 is in the closed position. A cover sensor 12 electrically connected to the controller 51 detects opening and closing of the cover 11.

Four slots SL are formed in the drum cartridge 20. One toner cartridge 30 is detachably mountable in each slot SL. While retaining four toner cartridges 30, the drum cartridge 20 is mounted in the main casing 10 as a process cartridge.

As shown in FIG. 2, the drum cartridge 20 has four photosensitive drums 21. The photosensitive drums 21 are cylindrical members elongated in the first direction and are rotatable about drum shafts extending in the first direction. As shown in FIG. 3, each photosensitive drum 21 has a cylindrically shaped aluminum tube 211 elongated in the first direction, and a photosensitive layer 213 covering the outer circumference of the aluminum tube 211. The photosensitive layer 213 is formed of a photosensitive material.

As shown in FIG. 2, the drum cartridge 20 has a drum memory 22. The drum memory 22 is flash ROM or EEPROM, for example. The drum memory 22 stores information related to the drum cartridge 20 to which the drum memory 22 is attached.

The drum cartridge 20 is provided with four chargers 23. Each charger 23 charges a corresponding photosensitive drum 21. Each charger 23 is a scorotron charger that includes a charging wire 231 extending along the first direction, and a grid 233, as shown in FIG. 3. The charging wire 231 and grid 233 are electrically connected to a voltage application circuit 15 provided in the main casing 10. Under control of the controller 51, the voltage application circuit 15 applies prescribed biases to the charging wire 231 and grid 233. The voltage application circuit 15 is provided with a transformer, for example.

The image forming apparatus 1 is also provided with a detector 17 that is electrically connected to the voltage application circuit 15. The detector 17 detects abnormalities in the drum cartridge 20, and specifically abnormal discharges in the chargers 23. An abnormal discharge is electrical discharge that differs from a normal corona discharge, and specifically an arc discharge or spark discharge.

When the charger 23 is used for a prolonged period of time, for example, components in the toner (silica, for example) become deposited on the charging wire 231, raising the impedance of the charging wire 231. When impedance rises, the electric current flowing in the grid 233 drops. Consequently, the voltage value of the charging wire 231 rises as the charger 23 attempts to maintain constant current in the grid 233. If the voltage value of the charging wire 231 rises above a prescribed value, an abnormal discharge occurs whereby a large amount of current flows between the charging wire 231 and grid 233. Such abnormal discharges may also cause a large amount of current to flow between the charging wire 231 and the surface of the photosensitive drum. Thus, in the event of an abnormal discharge, the charger 23 can no longer apply a uniform charge to the photosensitive drum 21, and image quality may drop.

As described above, the image forming apparatus 1 is provided with the detector 17 to detect such abnormal discharges. If an abnormal discharge occurs while the controller 51 controls the voltage application circuit 15 to apply prescribed biases to the charging wires 231 and grids 233, an overcurrent is generated in the transformer provided in the voltage application circuit 15. The detector 17 detects overcurrent in the voltage application circuit 15 exceeding a prescribed threshold. Since the detector 17 is electrically connected to the controller 51, the controller 51 detects abnormal discharges in the chargers 23 based on output from the detector 17. Note that the controller 51 is also electrically connected to the charging wire 231 and grid 233 of each charger 23 and can read voltage values being applied across the charging wires 231 and grids 233.

As shown in FIG. 2, each toner cartridge 30 is provided with a developing roller 31, a toner memory 32, and a casing 33. The developing roller 31 is a cylindrically shaped member that is elongated in the first direction. The developing roller 31 is rotatable about a developing shaft extending along the first direction. The toner memory 32 is a storage medium that allows the reading and writing of information, such as flash ROM or EEPROM. The toner memory 32 stores information related to the toner cartridge 30 to which the toner memory 32 is attached. The casings 33 of the four toner cartridges 30 accommodate toner in mutually different colors (one of the colors cyan, magenta, yellow, and black, for example).

While the toner cartridges 30 are mounted in the drum cartridge 20 and the cover 11 is disposed in the open position, the drum cartridge 20 is mounted in the main casing 10, as shown in FIG. 2. That is, the drum cartridge 20 with the mounted toner cartridges 30 is inserted through the opening in the main casing 10 and mounted into a cartridge retaining section.

The four light source units are mounted on an inner surface of the main casing 10. When the drum cartridge 20 is mounted in the main casing 10 and the cover 11 is moved to the closed position, the light source units face the surfaces of corresponding photosensitive drums 21. The light source units can irradiate light onto the outer circumferential surfaces of the corresponding photosensitive drums 21. The light sources in the light source units may be lasers or light-emitting diodes (LEDs).

The transfer unit 40 has a transfer belt 41, a drive roller 43, a follow roller 45, and four transfer rollers 47. The transfer belt 41 is annular in shape (an endless belt). The outer circumferential surfaces of the photosensitive drums 21 can contact the outer surface of the transfer belt 41. The transfer belt 41 is stretched around the drive roller 43 and follow roller 45. The controller 51 circulates the transfer belt 41 by driving the drive roller 43. The follow roller 45 rotates along with the circulating transfer belt 41 being driven by the drive roller 43.

The four transfer rollers 47 are positioned in the space formed inside the annular transfer belt 41. The transfer rollers 47 are cylindrical in shape and elongated in the first direction. The transfer rollers 47 are rotatable about rotational shafts extending in the first direction. The outer circumferential surfaces of the transfer rollers 47 are configured of a conductive rubber, for example. The voltage application circuit 15 is electrically connected to the transfer rollers 47 and applies a transfer bias to the transfer rollers 47 when needed.

The transfer rollers 47 are positioned beneath corresponding photosensitive drums 21. The transfer belt 41 is interposed between the photosensitive drums 21 and transfer rollers 47. When a transfer bias is applied to the outer circumferential surface of a transfer roller 47, toner deposited on the outer surface of the corresponding photosensitive drum 21 is transferred in a direction toward the transfer belt 41. Consequently, toner is transferred onto printing paper carried on the transfer belt 41.

When a printing process is performed on the image forming apparatus 1, each charger 23 applies a uniform charge over the entire surface of the corresponding photosensitive drum 21. The corresponding light source unit irradiates laser light or LED light onto the photosensitive drum 21 based on the image to be printed. Next, the corresponding developing roller 31 deposits toner onto the surface of the photosensitive drum 21 that was exposed to the light source. The transfer unit 40 transfers toner carried on all photosensitive drums 21 onto the printing paper. After toner has been transferred onto the printing paper, the paper passes through a fixing unit (not shown) that thermally fixes the toner to the printing paper. Any toner remaining on the photosensitive drums 21 is removed from the photosensitive drums 21 by corresponding cleaning rollers 25 (see FIG. 3).

As shown in FIG. 4, the image forming apparatus 1 has the controller 51, an operating unit 53, the display 55, and a network interface 57. The controller 51 has a CPU 511, and an apparatus body memory 513. The apparatus body memory 513 stores a program 515. The controller 51 executes various processes with the CPU 511 operating in accordance with the program 515. Note that the controller 51 may be provided with a dedicated circuit, such as an application-specific integrated circuit (ASIC).

The controller 51 sets the operating mode for the image forming apparatus 1 to either a subscription mode or a normal mode and performs processes in accordance with the selected operating mode. As will be described later, the operating mode of the image forming apparatus 1 is set to the subscription mode or normal mode based on a configuration command received from the server 7. Process details corresponding to the subscription mode and normal mode are specified in the program 515.

The operating unit 53 is configured of buttons that receives user operations. The display 55 displays images representing various information. The display 55 may also be configured as a touchscreen that functions as the operating unit 53.

When the drum cartridge 20 and the four toner cartridges 30 are mounted in the main casing 10, the drum memory 22 and the four toner memories 32 are electrically connected to the controller 51, as shown in FIG. 4. Through these connections, the controller 51 can perform data communications with the drum memory 22 and the toner memories 32.

The drum memory 22 stores a drum ID, drum life information, drum type information, drum history information, an on-order flag, and threshold information. The drum ID is identification information that identifies an individual drum cartridge 20, and specifically is a serial number. The drum life information may include the cumulative number of rotations of the photosensitive drums 21, and the cumulative number of pages printed using the photosensitive drums 21, for example. The cumulative number of rotations of the photosensitive drums 21 is calculated by incrementing or decrementing a rotation number for the drum cartridge 20 identified by the drum ID each time the drum cartridge 20 is used for a print job. The cumulative number of pages printed using the photosensitive drums 21 is calculated by incrementing or decrementing a printed page number for the drum cartridge 20 identified by the drum ID each time the drum cartridge 20 is used in a print job.

The drum type information is information representing the type of the drum cartridge 20, such as "normal drum" or "low-cost drum." Hereinafter, a drum cartridge 20 having the drum type information "normal drum" will be called a "normal drum cartridge 20," and a drum cartridge 20 having the drum type information "low-cost drum" will be called a "low-cost drum cartridge 20."

A low-cost drum cartridge 20 is less expensive than a normal drum cartridge 20 and is less durable than a normal drum cartridge 20. Specifically, the cost or durability of a drum cartridge 20 may be altered by modifying at least one of the material forming the photosensitive layer 213, the thickness of the photosensitive layer 213, and the material forming the cleaning roller 25.

The drum history information specifies whether abnormalities in the drum cartridge 20 were detected. When an abnormality is detected in the drum cartridge 20, the controller 51 records this abnormality as drum history information. Specifically, drum history information includes discharge history information specifying whether abnormalities were detected in the chargers 23 of the drum cartridge 20. The discharge history information includes a pre-discharge detection count and a discharge detection count.

The discharge detection count indicates the number of discharge abnormalities detected in a discharge checking process described later (see FIG. 12). A discharge abnormality signifies a condition in which an abnormal discharge has occurred. Specifically, the controller 51 detects and counts a discharge abnormality when the detector 17 detects overcurrent in the charger 23.

Note that the controller 51 may detect and count a discharge abnormality when the number of abnormal discharges occurring in the charger 23 within a prescribed interval exceeds a threshold representing a discharge abnormality. The frequency of abnormal discharges may also be the number of times that the electric current value in the charging wire 231 is greater than or equal to a threshold representing an abnormal discharge. For example, the controller 51 detects one discharge abnormality when an abnormal discharge (overcurrent) occurs three or more times within 50 msec and increments the discharge detection count by one (1).

The pre-discharge detection count is the number of pre-discharge abnormalities detected in the discharge checking process. A pre-discharge abnormality indicates a condition in which an abnormal discharge is likely to occur. Specifically, the controller 51 detects and counts a pre-discharge abnormality if the voltage value in the charging wire 231 becomes greater than or equal to a prescribed threshold when a prescribed bias is applied to the charger 23.

The on-order flag is information indicating whether an order was placed for a new drum cartridge 20. The controller 51 executes a transmission process to transmit order information to the server 7 for ordering a new drum cartridge 20 prior to the remaining life of the drum cartridge 20 in the image forming apparatus 1 expiring, that is, prior to the end of the operational life of the drum cartridge 20 being reached life. The controller 51 executes the transmission process also when an abnormality has been detected. When executing the transmission process, the controller 51 updates the on-order flag in the drum memory 22 of the drum cartridge 20 mounted in the main casing 10 to indicate that a new drum cartridge 20 has been ordered. Updating the on-order flag can prevent the controller 51 from sending duplicate order information for a new drum cartridge 20.

The threshold information specifies threshold values used in the various determination processes that the controller 51 executes for the drum cartridge 20. For example, threshold information may include a threshold value for determining whether the remaining life of the drum cartridge 20 expires or not, and a threshold value for determining whether an abnormality has occurred in the drum cartridge 20.

The drum memory 22 may also store data of model of the image forming apparatus 1 in which the drum cartridge 20 can be used, specifications of the drum cartridge 20, information indicating whether the drum cartridge 20 is a new product, information indicating whether the drum cartridge 20 is a genuine product, error history of the drum cartridge 20, and the like.

As shown in FIG. 4, the toner memory 32 stores a toner ID, toner life information, and toner type information. The toner ID is identification information for identifying an individual toner cartridge 30, and specifically a serial number. The toner life information is at least one of a cumulative number of rotations of the developing roller 31, a cumulative number of pages printed using the developing roller 31, and a cumulative number of dots. The cumulative number of rotations of the developing roller 31 is calculated by incrementing or decrementing a rotation number for the single toner cartridge 30 identified by the toner ID each time the toner cartridge 30 performs a print job. The cumulative number of pages printed using the developing roller 31 is calculated by incrementing or decrementing a printed page number for the single toner cartridge 30 identified by the toner ID each time the toner cartridge 30 performs a print job. The cumulative number of dots formed using the developing roller 31 is calculated by incrementing or decrementing a dot number for the single toner cartridge 30 identified by the toner ID each time the toner cartridge 30 performs a print job. Instead of the cumulative number of dots, the toner memory 32 may store information indicating the residual quantity of toner accommodated in the casing 33.

The toner type information indicates the type of the toner cartridge 30, and specifically is one of "subscribed" and "normal." Hereinafter, a toner cartridge 30 having the toner type information "subscribed" will be called a "subscribed toner cartridge 30," and a toner cartridge 30 having the toner type information "normal" will be called a "normal toner cartridge 30." As described later, the toner type information is used for controlling usage of the toner cartridge 30 in the image forming apparatus 1.

The toner memory 32 may also store model of the image forming apparatus, in which the toner cartridge 30 can be used, specifications of the toner cartridge 30, information indicating whether the toner cartridge 30 is a new product, information indicating whether the toner cartridge 30 is a genuine product, and the like.

The controller 51 permits normal toner cartridges 30 to be used in both the normal mode and the subscription mode.

That is, when the normal toner cartridges 30 are mounted in the main casing 10 of the image forming apparatus 1, the controller 51 can execute printing processes whether the operating mode of the image forming apparatus 1 is set to the normal mode or the subscription mode. However, the controller 51 prohibits printing processes with subscribed toner cartridges 30 when the operating mode is set to the normal mode but allows printing processes when the operating mode is set to the subscription mode. Note that the controller 51 may permit usage of subscribed toner cartridges 30 in the normal mode under certain conditions and need not always prevent the usage of subscribed toner cartridges 30. For example, the controller 51 may display a screen or the like on the display 55 prompting the user to replace the subscribed toner cartridge 30 with a normal toner cartridge 30 or may display a warning screen on the display 55 warning the user that use of the subscribed toner cartridge 30 is a breach of contract.

The apparatus body memory 513 is configured to store drum information and toner information. Drum information represents the drum cartridge 20 mounted in the main casing 10 and specifically includes the drum ID, drum life information, drum type information, drum history information, on-order flag, and threshold information. The toner information is information related to each toner cartridge 30 mounted in the main casing 10 and specifically includes the toner ID, toner type information, and toner life information for each toner cartridge 30.

The controller 51 stores various information read from the drum memory 22 in the apparatus body memory 513 as the drum information. The controller 51 also stores various information read from each toner memory 32 in the apparatus body memory 513 as the toner information. The controller 51 also updates this drum information and toner information as needed. The controller 51 also updates the various information stored in the corresponding drum memory 22 and toner memories 32 based on the updated drum information and toner information in the apparatus body memory 513.

<Practical Examples for the Image-Forming System>

Figure 5:
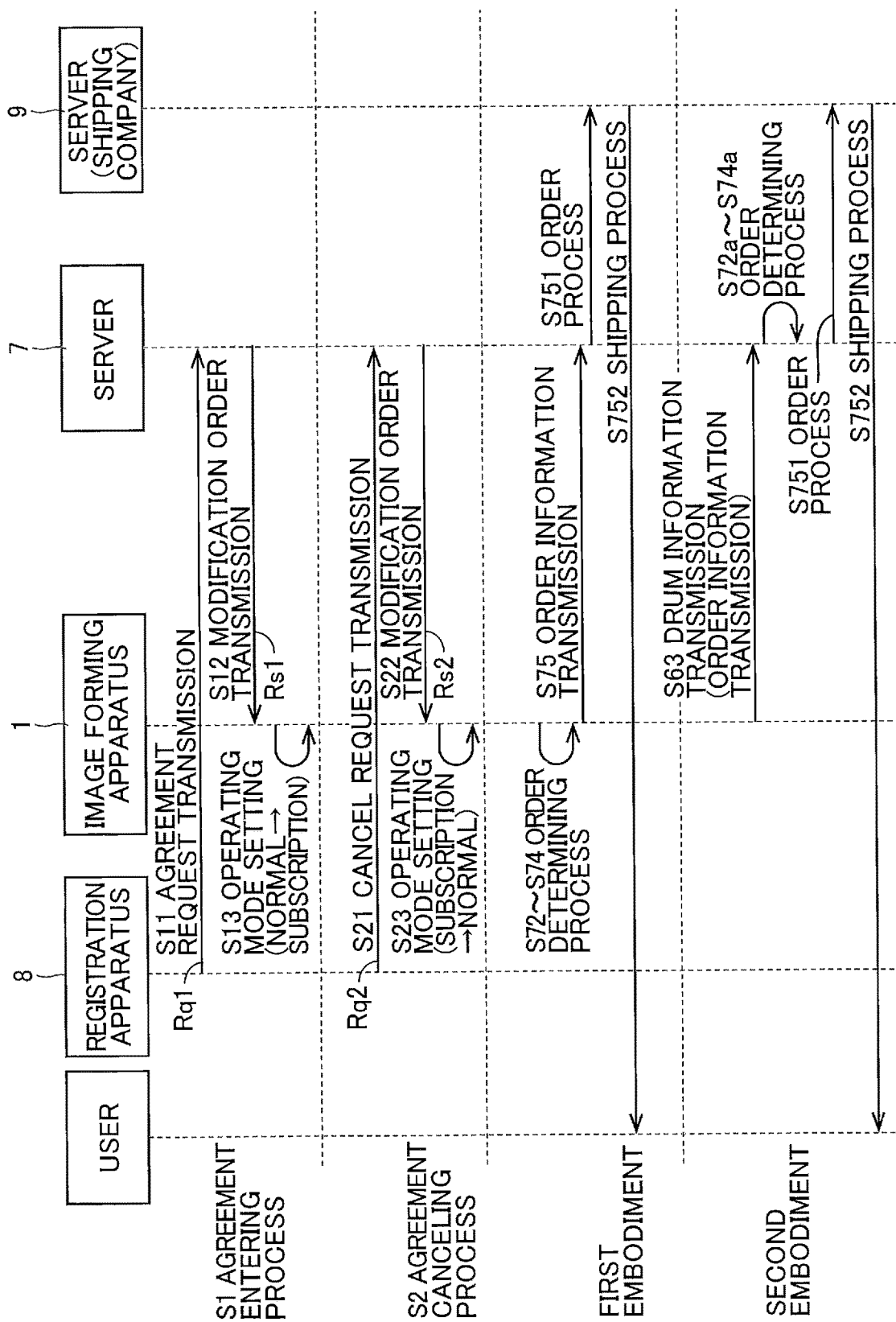
FIG. 5 shows an agreement entering process and an agreement canceling process executed on the image forming apparatus according to the first embodiment.

FIG. 5 shows an agreement entering process S1 and an agreement canceling process S2 executed on the image forming system 100 according to a first embodiment. The agreement entering process S1 is performed when a normal user is entering an agreement with a supplier and includes a process for changing the operating mode of the target image forming apparatus 1 in the image forming system 100 from the normal mode to the subscription mode. The agreement canceling process S2 is performed when a contracted user is canceling an agreement and is a process for changing the operating mode of the target image forming apparatus 1 on the image forming system 100 from the subscription mode to the normal mode. These processes will be described next.

<Agreement Entering Process>

In the agreement entering process S1, the registration apparatus 8 first transmits an agreement request Rq1 to the server 7 (agreement request transmission process S11). The agreement request Rq1 may include information related to the user wishing to enter an agreement (including the user's name, address, etc.), information about the agreement such as the fee, information about payment, and device information identifying the image forming apparatus 1 used by the user (device ID). Note that it is not essential for the registration apparatus 8 to perform the agreement request transmission process. For example, the user may perform prescribed operations on the image forming apparatus 1 in order to have the image forming apparatus 1 transmit the agreement request Rq1 to the server 7.

Based on the agreement request Rq1 received from the registration apparatus 8, the server 7 transmits a modification order Rs1 to the image forming apparatus 1 for which the agreement was requested (modification order transmission process S12). The modification order Rs1 is a command to the controller 51 provided in the target image forming apparatus 1 ordering the controller 51 to set its operating mode to the subscription mode. Upon receiving the modification order Rs1, the controller 51 sets its operating mode to the subscription mode (operating mode setting process S13). In the following description, an image forming apparatus 1 whose controller 51 has the operating mode set to the subscription mode will be called a "contracted image forming apparatus 1."

As will be described later, the subscription mode includes two sub-operating modes: a low-cost subscription mode and a high-cost subscription mode. The controller 51 executes different control concerning use life of the drum cartridge 20 during its remaining life depending on what sub-operating mode has been set. Specific details of this control will be described later. Here, the sub-operating mode is set to the low-cost subscription mode when the user enters an agreement having a lower fee (lower cost) than the fee for the high-cost subscription mode.

<Agreement Canceling Process>

In the agreement canceling process S2, the registration apparatus 8 first transmits a cancel request Rq2 to the server 7 (cancel request transmission process S21). The cancel request Rq2 may include information related to the user desiring to cancel the agreement. Note that it is not essential for the registration apparatus 8 to perform the cancel request transmission process. For example, the user may perform a prescribed operation on the image forming apparatus 1 to have the image forming apparatus 1 transmit the cancel request Rq2 to the server 7.

Based on the cancel request Rq2 received from the registration apparatus 8, the server 7 transmits a modification order Rs2 to the image forming apparatus 1 for which the cancelation was requested (modification order transmission process S22). The modification order Rs2 is a command for the controller 51 provided in the target image forming apparatus 1 ordering the controller 51 to set its operating mode to the normal mode. Upon receiving the modification order Rs2, the controller 51 sets its operating mode to the normal mode (operating mode setting process S23). Hereinafter, an image forming apparatus 1 whose controller 51 has its operating mode set to the normal mode will be called a "normal image forming apparatus 1."

Figure 6:
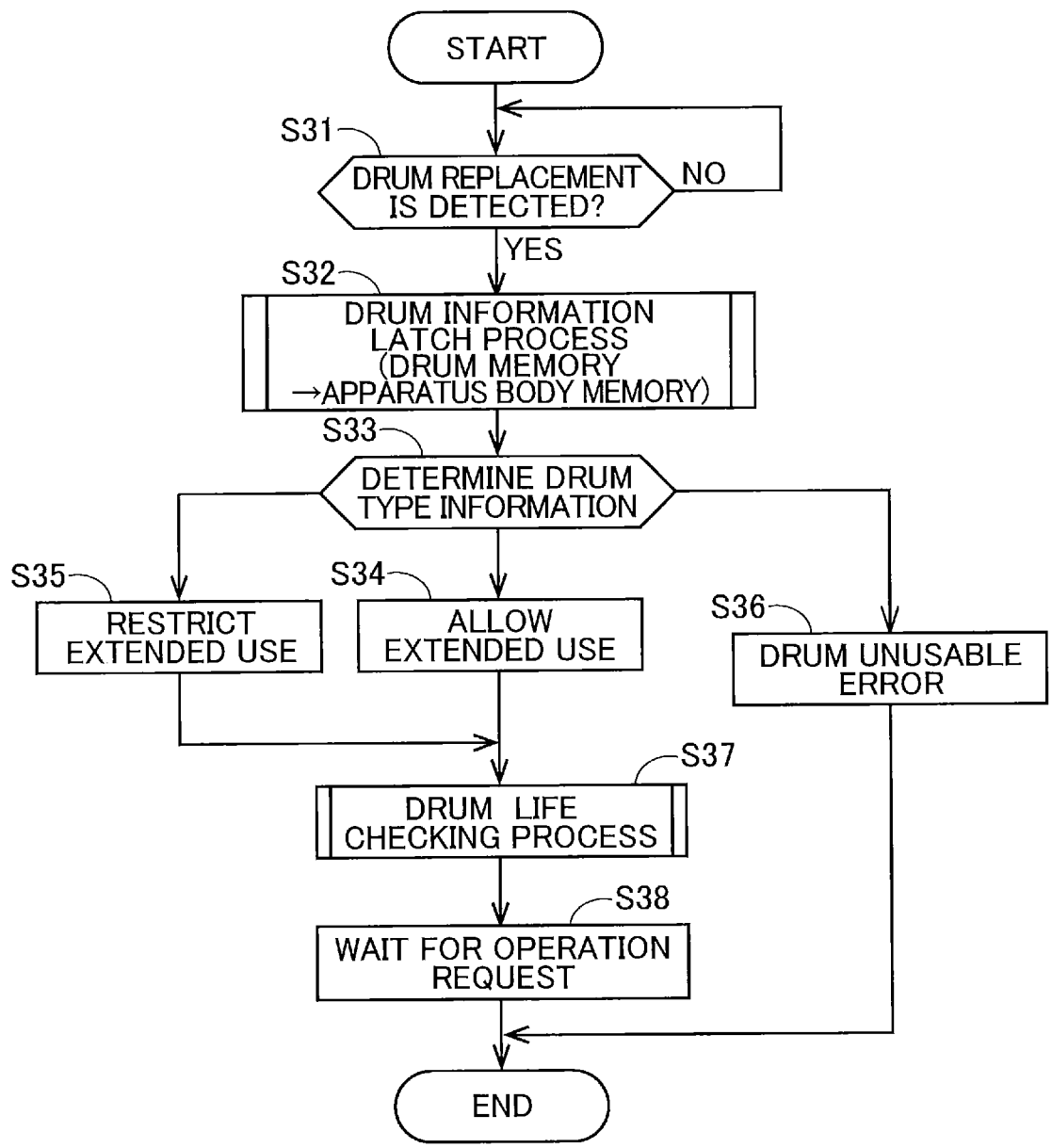
FIG. 6 is a flowchart illustrating steps in a drum checking process executed when a drum cartridge is replaced in the image forming apparatus.

FIG. 6 is a flowchart illustrating steps in a drum checking process executed when the drum cartridge 20 is replaced in the image forming apparatus 1. The steps in FIG. 6 are executed by the controller 51 of the image forming apparatus 1 unless otherwise noted.

In S31 of FIG. 6 the controller 51 of the image forming apparatus 1 executes a replacement determination process. The replacement determination process serves to determine whether the drum cartridge 20 was replaced. Specifically, when the power to the image forming apparatus 1 was switched from off to on, or when the cover sensor 12 detects that the cover 11 was moved from the open position to the closed position, the controller 51 compares the drum ID of the drum cartridge 20 presently mounted in the main casing 10 to the drum ID previously stored in the apparatus body memory 513. The controller 51 determines that the drum cartridge 20 was not replaced when the drum IDs match (S31: NO) and that the drum cartridge 20 was replaced when the drum IDs do not match (S31: YES).

When the controller 51 determines in S31 that the drum cartridge 20 was replaced, in S32 the controller 51 executes a drum information latch process. In the drum information latch process, the controller 51 reads various information stored in the drum memory 22 and writes this information to the apparatus body memory 513. With this structure, when the drum cartridge 20 is replaced, the controller 51 can retrieve the drum information of the drum cartridge 20 currently attached to the main casing 10.

Figure 7:
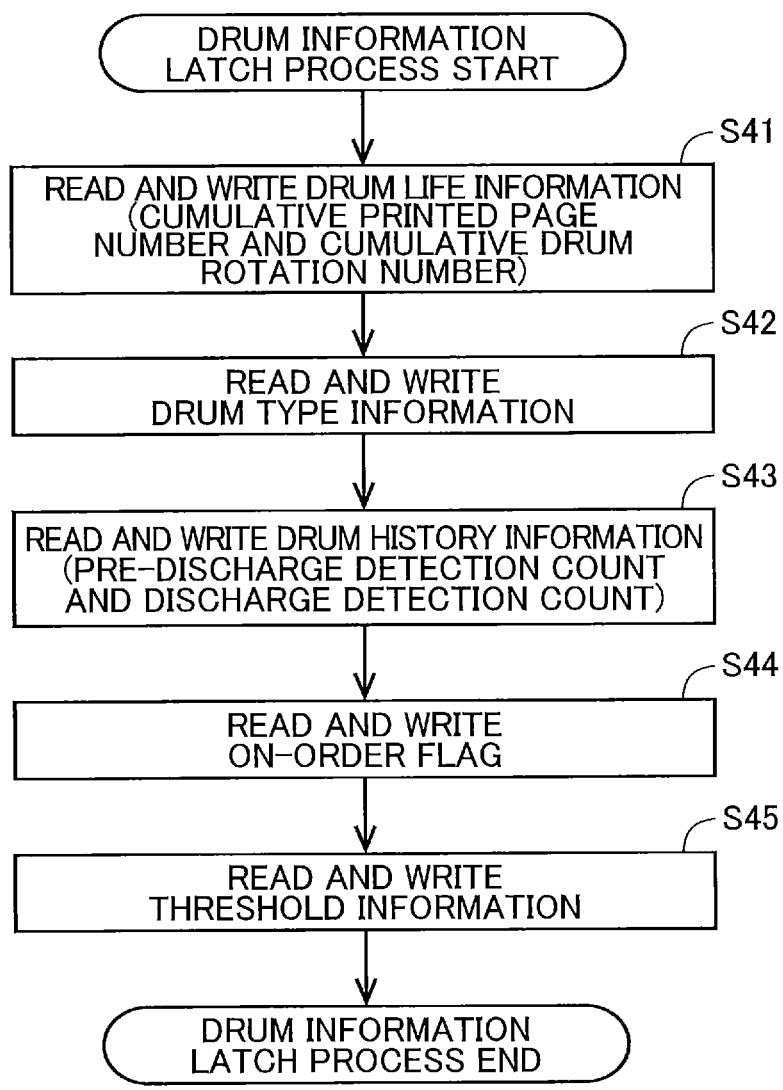
FIG. 7 shows more detailed steps in the drum information latch process.

FIG. 7 shows more detailed steps in the drum information latch process of S32. In S41 of FIG. 7, the controller 51 performs a read/write process to read and write drum life information. In S42 the controller 51 performs a read/write process to read and write drum type information. In S43 the controller 51 performs a read/write process to read and write drum history information. In S44 the controller 51 performs a read/write process to read and write the on-order flag. In S45 the controller 51 performs a read/write process to read and write threshold information.

In the read/write process of S41, the controller 51 stores the cumulative printed page number and cumulative drum rotation number representing the drum life information read from the drum memory 22 in the apparatus body memory 513 as drum information. Further, in S43 the controller 51 stores the pre-discharge detection count and discharge detection count representing the drum history information read from the drum memory 22 in the apparatus body memory 513 as drum information.

Returning to FIG. 6, after completing the drum information latch process in S32, in S33 the controller 51 executes a process to determine extendibility. In this process, the controller 51 references the drum type information for the drum cartridge 20 to determine whether the life of the drum cartridge 20 can be extended. Based on the determination results in S33, the controller 51 executes one of a process in S34 to allow extended use, a process in S35 to restrict extended use, or an error process in S36.

FIG. 8 is a table showing details of control stipulated for drum cartridges 20 based on the operating mode of the image forming apparatus 1 and the drum type information. The controller 51 selectively executes one of the process to allow extended use and the process to restrict extended use based on the operating mode that has been set for the controller 51 and the drum type information stored in the drum memory 22.

Specifically, control to allow extended use enables the user to continue using the drum cartridge 20 even after the drum cartridge 20 has exceeded the remaining life indicated by the drum life information stored in the apparatus body memory 513, that is, even after the drum cartridge 20 has reached the end of the operational life. The user can use the drum cartridge 20 for a period of time longer than the operational life of the cartridge 20. Further, the control to restrict extended use prevents the user to continue using the drum cartridge 20 when the drum cartridge 20 has exceeded the remaining life indicated in the drum life information stored in the apparatus body memory 513, that is, when the drum cartridge 20 has reached the end of the operational life. It is possible to prevent a decline in image quality.

As shown in FIG. 8, the controller 51 performs control to allow extended use of a normal drum cartridge 20 regardless of the operating mode. However, for a low-cost drum cartridge 20, the controller 51 performs control to allow extended use when the operating mode is set to the low-cost subscription mode but performs control to restrict extended use when the operating mode is set to the high-cost subscription mode. With this structure, in the high-cost subscription mode, it is possible to prevent a decline in image quality. Further, because the low-cost drum cartridge 20 is less expensive than the normal drum cartridge 20, the low-cost drum cartridge 20 can be used inexpensively as a subscribed drum cartridge until the low-cost drum cartridge 20 has exceeded its life. Still further, it is possible to prevent a decline in image quality due to using the low-cost drum cartridge 20 with low durability after the low-cost drum cartridge 20 has reached its operational life.

Note that the controller 51 prevents use of a low-cost drum cartridge 20 when the image forming apparatus 1 is set to the normal mode, thereby restricting usage of low-cost drum cartridges 20 to the contracted user.

When the operating mode is the high-cost subscription mode, "normal drum" of the drum type information corresponds to "allowance information". "low-cost drum" of the drum type information corresponds to "restriction information". Here, "allowance information" indicates that usage of the drum cartridge 20 can be continued after the drum cartridge exceeds its remaining life, while "restriction information" indicates that usage of the drum cartridge 20 is restricted continued after the drum cartridge exceeds its remaining life.

The process to allow extended use in S34 and the process to restrict extended use in S35 of FIG. 6 include a process for storing an extendible flag in the apparatus body memory 513 indicating whether extended use is allowed or restricted. More specifically, the process to allow extended use in S34 includes a process for storing an extendible flag in the apparatus body memory 513 indicating that the extended use is allowed. The process to restrict extended use in S35 includes a process for storing an extendible flag in the apparatus body memory 513 indicating that the extended use is restricted. Further, the error process in S36 includes a process for storing a prohibited flag in the apparatus body memory 513 indicating that use of the drum cartridge 20 is prohibited. The error process may also include a process for displaying a prescribed screen on the display 55 requesting that the user should replace the low-cost drum cartridge 20 mounted in the main casing 10 with a suitable normal drum cartridge 20. After completing the error process in S36, the controller 51 ends the discharge checking process.

On the other hand, if the controller 51 executes one of the process to allow extended use in S34 and the process to restrict extended use in S35, in S37 the controller 51 executes a drum life checking process. The controller 51 executes the drum life checking process of S37 to check the drum history information and drum life information, which were stored in the apparatus body memory 513 in the drum information latch process of S32.

Figure 9:
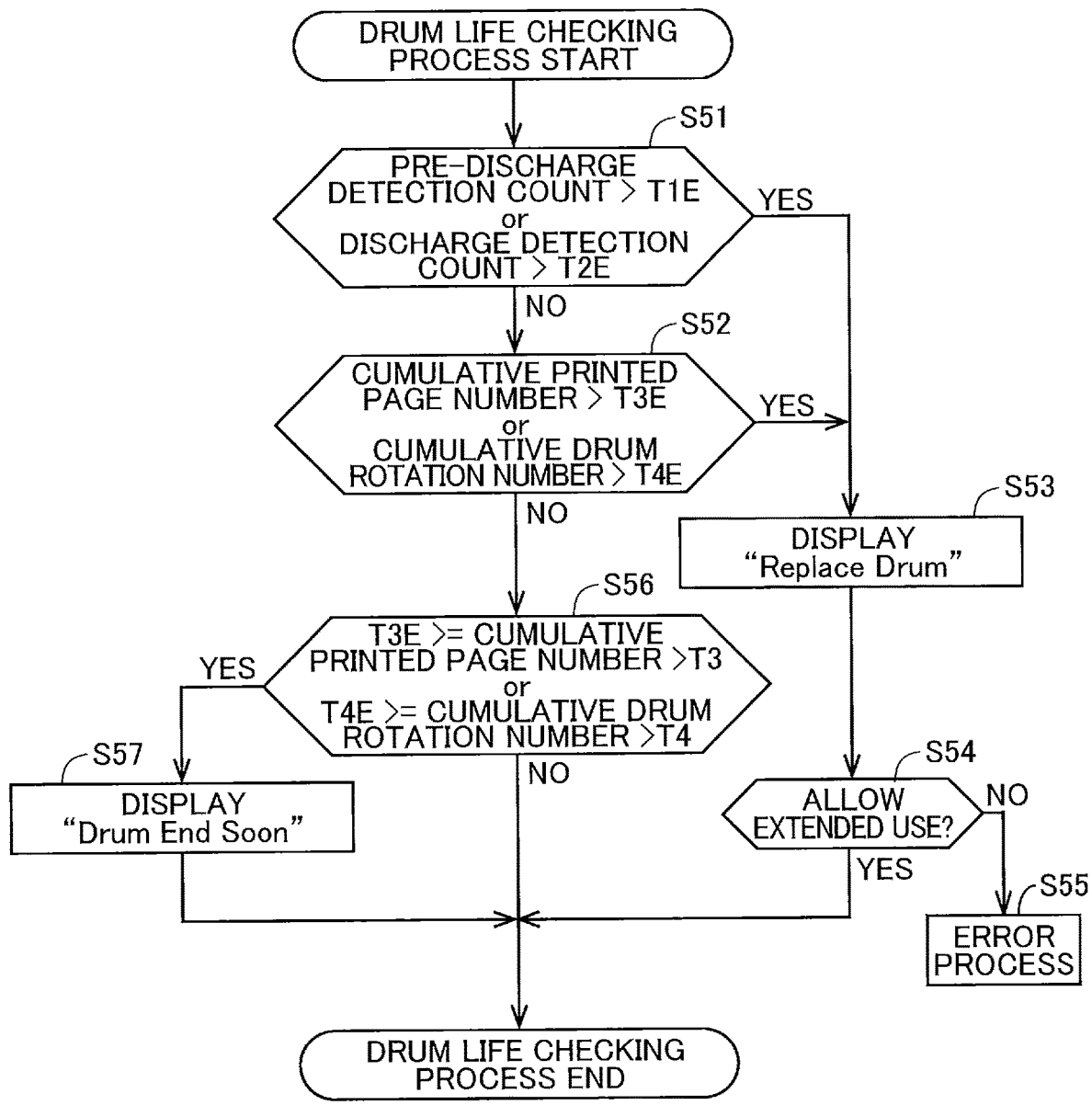
FIG. 9 is a flowchart illustrating steps in a drum life checking process shown in FIG. 6.

FIG. 9 illustrates steps in the drum life checking process of S37 shown in FIG. 6. In S51 at the beginning of the drum life checking process, the controller 51 performs a determination process to determine whether the drum cartridge 20 has reached a state in which replacement is necessary (hereinafter called a "replacement needed state") based on the drum history information stored in the apparatus body memory 513. Specifically, in S51 the controller 51 determines whether the pre-discharge detection count indicated in the drum history information exceeds a threshold T1E representing a replacement needed state and whether the discharge detection count indicated in the drum history information exceeds a threshold T2E representing a replacement needed state. Note that in S51 the controller 51 should at least determine whether the discharge detection count exceeds the threshold T2E. Alternatively, the controller 51 may determine in S51 whether the pre-discharge detection count exceeds the threshold T1E or whether the discharge detection count exceeds the threshold T2E.

If the controller 51 determines in S51 that either the pre-discharge detection count exceeds the threshold T1E or the discharge detection count exceeds the threshold T2E (S51: YES), the controller 51 determines that the drum cartridge 20 is in a replacement needed state and advances to S53 described below. Note that the controller 51 may also measure the voltage value of the charging wire 231 after determining in S51 that the discharge detection count exceeds the threshold T2E. In this case, the controller 51 may execute the display process in S53 when determining that the voltage value measured for the charging wire 231 is lower than a prescribed voltage value (or that the measured voltage value is an abnormal value). If the controller 51 determines in S51 that the pre-discharge detection count does not exceed the threshold T1E and the discharge detection count does not exceed the threshold T2E (S51: NO), the controller 51 executes the determination process in S52.

In S52 the controller 51 determines whether the drum cartridge 20 is in a replacement needed state based on the drum life information stored in the apparatus body memory 513. Specifically, in S52 the controller 51 determines whether the cumulative printed page number in the drum life information exceeds a threshold T3E representing a replacement needed state and whether the cumulative drum rotation number in the drum life information exceeds a threshold T4E representing a replacement needed state. If the controller 51 determines in S52 that the cumulative printed page number exceeds the threshold T3E or that the cumulative drum rotation number exceeds the threshold T4E (S52: YES), the controller 51 executes the display process in S53. However, if the controller 51 determines in S52 that the cumulative printed page number does not exceed the threshold T3E and that the cumulative drum rotation number does not exceed the threshold T4E (S52: NO), the controller 51 executes the determination process of S56.

In the display process of S53, the controller 51 displays a screen on the display 55 prompting the user to replace the drum cartridge 20. For example, the screen may include the text "Replace Drum." After completing the display process, in S54 the controller 51 executes an extendible determination process to determine whether extended usage of the drum cartridge 20 is allowed. That is, if control to allow extended use was performed through the process in S34 (see FIG. 6; S54: YES), the controller 51 ends the drum life checking process. However, if control to restrict extended use was performed in S35 of FIG. 6 (S54: NO), in S55 the controller 51 executes an error process. The error process includes a process to display a prescribed error message on the display 55 (for example, "Drum Unusable") and a process to prohibit use of the drum cartridge 20. Note that in the error process of S55 the controller 51 need not prohibit use of the drum cartridge 20 but may continue to allow use under specific conditions. In this way, the controller 50 can perform control to allow or limit the extended use of the drum cartridge 20 when the drum cartridge 20 has exceeded the remaining life. Further, the controller 50 can notify to the user that the drum cartridge should be replaced via the display 55. Still further, when the drum cartridge 20 has reached a state in which the drum cartridge 20 should be replaced, the drum cartridge 20 is prohibited from being used. Accordingly, a decline in image quality can be suppressed.

In S56 the controller 51 determines whether the drum cartridge 20 has reached a state in which a new drum cartridge 20 must be ordered based on the drum life information. Hereinafter, this state of the drum cartridge 20 will be called an "order needed state." The order needed state is a state prior to the replacement needed state, and is a state in which a new drum cartridge should be ordered. The order needed state is a state in which the remaining life of the drum cartridge 20 has become low or in which the occurrence of a malfunction or other problem is likely.

Specifically, in S56 the controller 51 determines whether the cumulative printed page number in the drum life information exceeds a prescribed threshold T3 representing an order needed state and whether the cumulative drum rotation number in the drum life information exceeds a threshold T4 representing an order needed state. If either the cumulative printed page number exceeds the threshold T3 or the cumulative drum rotation number exceeds the threshold T4 (S56: YES), the controller 51 advances to the display process in S57. However, if the controller 51 determines that the cumulative printed page number does not exceed the threshold T3 and that the cumulative drum rotation number does not exceed the threshold T4 (S56: NO), the controller 51 ends the drum life checking process.

In S57 the controller 51 displays a screen on the controller 51 indicating that the drum cartridge 20 is in an order needed state (for example, a screen that includes the text "Drum End Soon"). After completing the display process of S57, the controller 51 ends the drum life checking process.

Returning to FIG. 6, after completing the drum life checking process of S37, in S38 the controller 51 executes a process to wait for operation requests. Specifically, the S38 is a process of placing the image forming apparatus 1 in a "Ready" state (waiting for operation request). That is, the controller 51 places the image forming apparatus 1 in the ready state to put the image forming apparatus 1 on standby.

Figure 10:
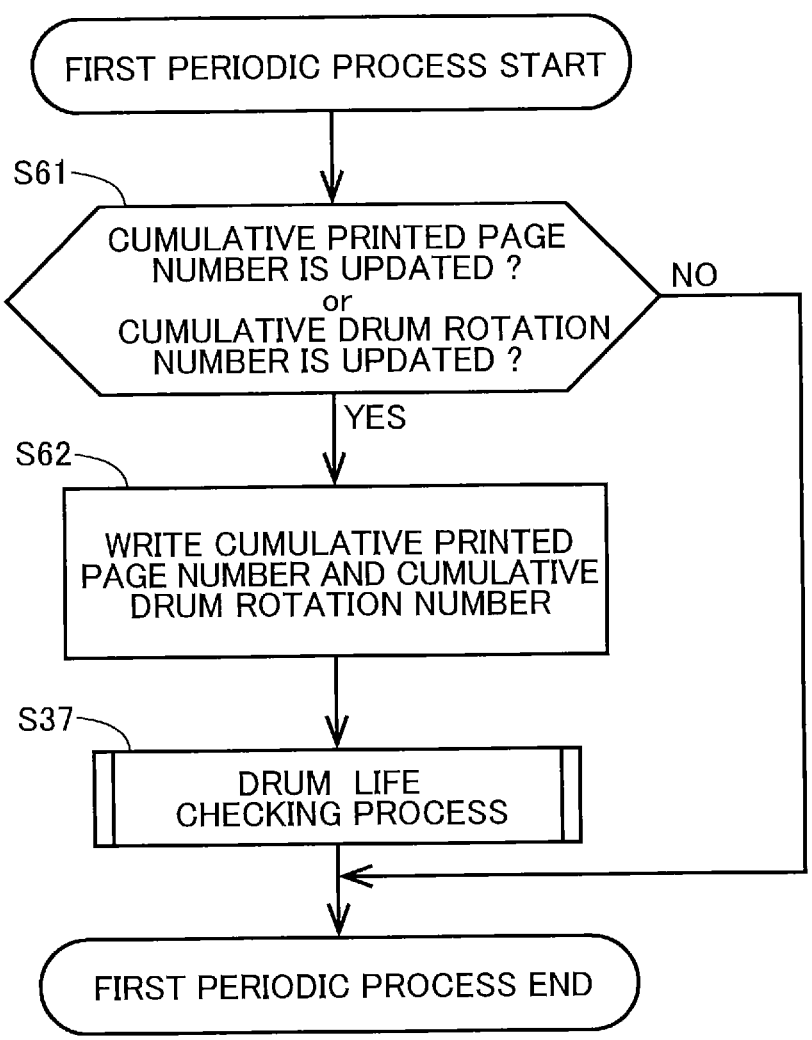
FIG. 10 is a flowchart illustrating steps in a first periodic process executed on the image forming apparatus.

FIG. 10 illustrates steps in a first periodic process executed on the image forming apparatus 1. The controller 51 executes the first periodic process at regular intervals or each time a prescribed event occurs. The first periodic process is performed to update the drum life information stored in the drum memory 22. In S61 at the beginning of the first periodic process, the controller 51 executes an update determination process. The update determination process is performed to determine whether the drum life information stored in the apparatus body memory 513 (and specifically, the cumulative printed page number and cumulative drum rotation number) were updated. That is, the controller 51 compares the drum life information stored in the apparatus body memory 513 to the drum life information stored in the drum memory 22 and determines that the drum life information in the apparatus body memory 513 was updated when the information is different.

If the controller 51 determines that drum life information was not updated (S61: NO), the controller 51 ends the first periodic process. However, if the controller 51 determines that the drum life information was updated (S61: YES), in S62 the controller 51 writes the drum life information in the apparatus body memory 513 to the drum memory 22. Upon completing the writing process in S62, the controller 51 executes the drum life checking process of S37 (see FIG. 9). Upon completing the drum life checking process in S37, the controller 51 ends the first periodic process.

Figure 11:
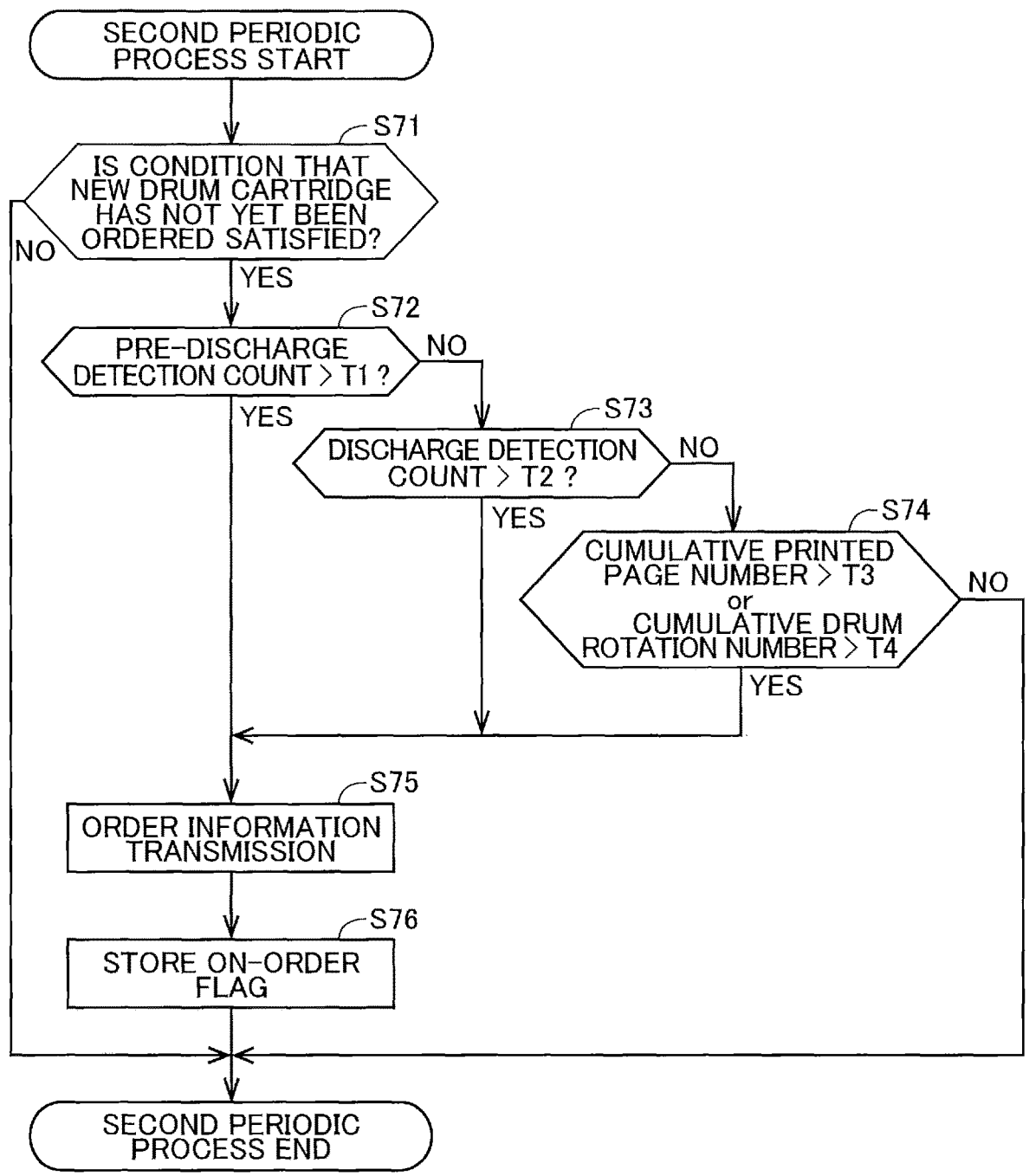
FIG. 11 is a flowchart illustrating steps in a second periodic process executed on the image forming apparatus when the image forming apparatus is operating in a subscription mode.

FIG. 11 illustrates steps in a second periodic process executed on the image forming apparatus 1 when the image forming apparatus 1 is operating in the subscription mode. The controller 51 executes the second periodic process at regular intervals or each time a prescribed event occurs. The second periodic process is performed to order a new drum cartridge 20.

In S71 at the beginning of the second periodic process, the controller 51 determines whether a condition that a new drum cartridge 20 has not yet been ordered is satisfied. The controller 51 makes this determination based on the on-order flag stored in the apparatus body memory 513. If the controller 51 determines in S71 that the condition that a new drum cartridge 20 has not been ordered is satisfied (S71: YES), the controller 51 advances to S72. However, if the controller 51 determines that the condition that a new drum cartridge 20 has been ordered is not satisfied (S71: NO), the controller 51 ends the second periodic process.

In S72 the controller 51 determines whether the drum cartridge 20 is in an order needed state based on the pre-discharge detection count in the drum history information stored in the apparatus body memory 513. Specifically, the controller 51 determines whether the pre-discharge detection count exceeds a threshold T1 representing an order needed state. If the controller 51 determines in S72 that the pre-discharge detection count exceeds the threshold T1 (S72: YES), the controller 51 executes an order information transmission process in S75 described below. However, if the controller 51 determines in S72 that the pre-discharge detection count does not exceed the threshold T1 (S72: NO), the controller 51 advances to S73.

In S73 the controller 51 determines whether the drum cartridge 20 is in an order needed state based on the discharge detection count specified in the drum history information stored in the apparatus body memory 513. Specifically, in S73 the controller 51 determines whether the discharge detection count exceeds a threshold T2 representing an order needed state. If the controller 51 determines in S73 that the discharge detection count exceeds the threshold T2 (S73: YES), the controller 51 executes the order information transmission process in S75 described below. However, if the controller 51 determines in S73 that the discharge detection count does not exceed the threshold T2 (S73: NO), the controller 51 advances to S74.

In S74 the controller 51 determines whether the drum cartridge 20 is in an order needed state based on the drum life information stored in the apparatus body memory 513. Specifically, the controller 51 determines in S74 whether the cumulative printed page number exceeds the threshold T3 representing an order needed state and whether the cumulative drum rotation number exceeds the threshold T4 representing an order needed state. If the controller 51 determines in S74 that at least one of the cumulative printed page number and cumulative drum rotation number exceeds the corresponding thresholds T3 and T4 (S74: YES), the controller 51 executes the order information transmission process of S75. However, if the controller 51 determines in S74 that neither the cumulative printed page number nor the cumulative drum rotation number exceeds their corresponding thresholds T3 and T4 (S74: NO), the controller 51 ends the second periodic process.

In S75 the controller 51 transmits order information to the server 7 to order a new drum cartridge 20. The order information may include information indicating that a new drum cartridge 20 is required, and device information for the image forming apparatus 1, for example. When the server 7 receives order information, the server 7 transmits the order information to a server 9 provided by a shipping company (order process S751), as shown in FIG. 5. Specifically, the order information includes such information as the name, address, and the like of the contracted user associated with the order information, and information indicating the type of the new drum cartridge 20 (a normal drum or low-cost drum). The shipping company then ships a new drum cartridge 20 to the contracted user listed in the order information (shipping process S752). Through this process, a contracted user can receive a new drum cartridge 20 before the drum cartridge 20 currently mounted in the main casing 10 reaches the replacement needed state. In this manner, a new drum cartridge 20 can be shipped to the user at an appropriate timing.

The order information transmission process of S75 may also include an approval determination process in which the controller 51 determines whether the transmission of order information has been authorized. Specifically, the controller 51 may display a screen on the controller 51 requesting approval to transmit order information and prompting the user to input such approval. Subsequently, the controller 51 may determine that approval was received when prescribed input was received from the user. The controller 51 then transmits the order information if the controller 51 determines in the approval determination process that approval was granted. Through this process, the controller 51 can be prevented from automatically transmitting order information to the server 7 without the user's approval.

After completing the transmission process in S75, in S76 the controller 51 executes an on-order flag process to store an on-order flag in the apparatus body memory 513 and the drum memory 22. Subsequently, the controller 51 ends the second periodic process.

In a case where the pre-discharge detection count is a parameter that is incremented, the threshold T1 is a smaller value than the threshold T1E. However, the pre-discharge detection count may be a parameter that is decremented. In this case, the threshold T1 would be a larger value than the threshold T1E. Such relationships are also true between the discharge detection count and thresholds T2 and T2E, the cumulative printed page number and thresholds T3 and T3E, and the cumulative drum rotation number and thresholds T4 and T4E.

Figure 12:
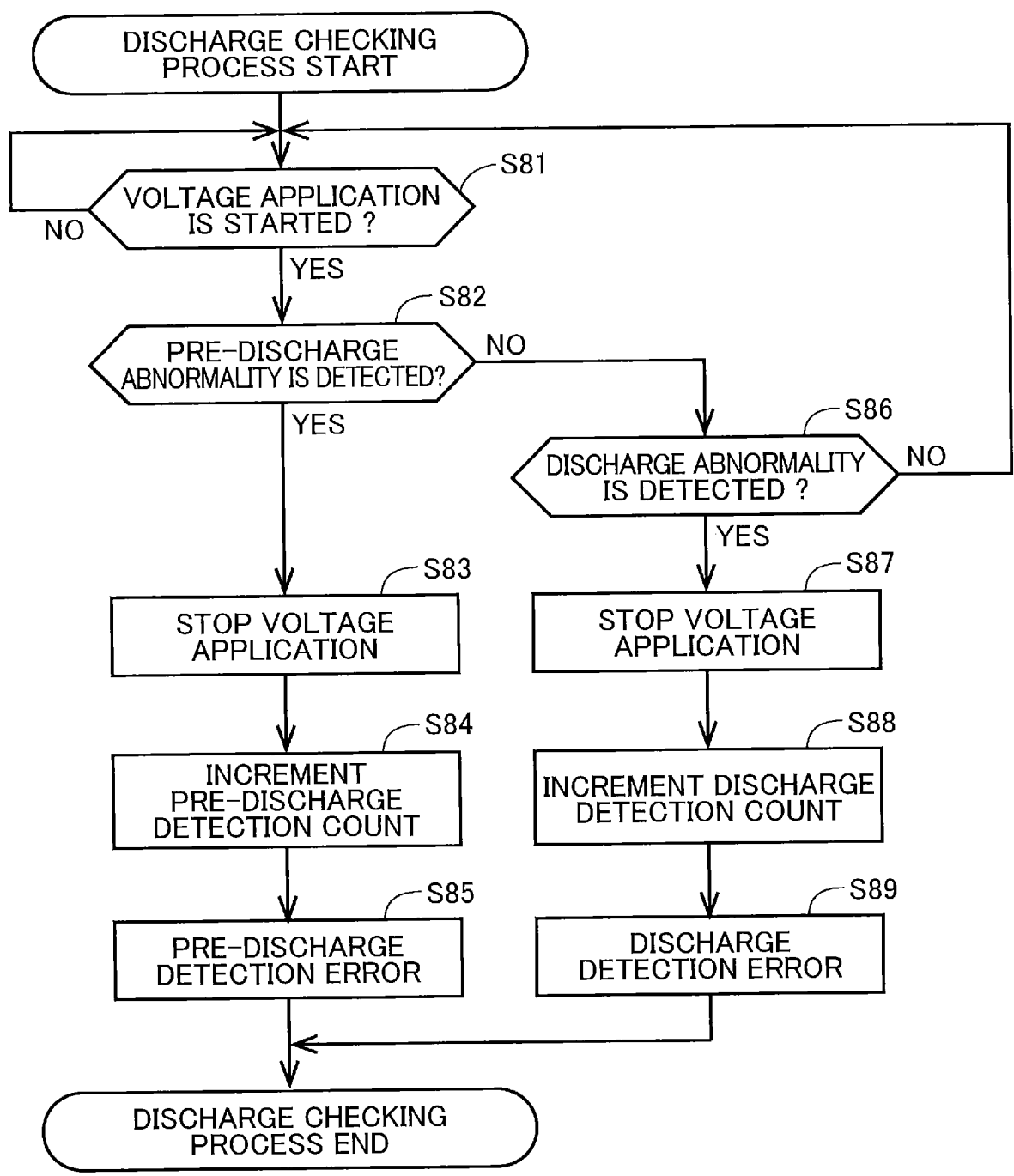
FIG. 12 is a flowchart illustrating steps in a discharge checking process executed on the image forming apparatus.

FIG. 12 illustrates steps in a discharge checking process executed on the image forming apparatus 1. In S81 at the beginning of the discharge checking process, the controller 51 determines whether application of a bias to the charger 23 was started. The controller 51 repeats this process while a bias is not being applied (S81: NO). When the controller 51 determines that bias application to the charger 23 was initiated (S81: YES), the controller 51 executes a pre-discharge determination process in S82. In this process, the controller 51 determines whether the voltage value applied across the charging wire 231 while the prescribed bias is being applied to the charger 23 is greater than or equal to a prescribed threshold. If the controller 51 determines that the voltage value of the charging wire 231 exceeds the prescribed threshold (S82: YES), the controller 51 determines that a pre-discharge abnormality has occurred and in S83 halts the bias being applied to the charger 23. After halting application of the bias to the charger 23, in S84 the controller 51 increments the pre-discharge detection count in the drum history information stored in the apparatus body memory 513. In S85 the controller 51 executes a pre-discharge detection error process. In this process, the controller 51 display a screen on the display 55 prompting the user to clean the charging wire 231. After completing the error process of S85, the controller 51 ends the discharge checking process.

However, if the controller 51 determines in S82 that no pre-discharge abnormality occurred (S82: NO), in S86 the controller 51 performs a discharge determination process. In this process, the controller 51 determines whether the detector 17 detected an overcurrent while the prescribed bias is being applied to the charger 23. If the controller 51 determines that detector 17 did not detect an overcurrent (S86: NO), the controller 51 returns to S81 described above. If the controller 51 determines that the detector 17 detected an overcurrent (S86: YES), the controller 51 determines that a discharge abnormality occurred and in S87 halts the bias application to the charger 23. After halting the bias application, in S88 the controller 51 increments the discharge detection count in the drum history information stored in the apparatus body memory 513. In S89 the controller 51 executes a discharge detection error process. In this process, the controller 51 displays a screen on the display 55 prompting the user to clean the charging wire 231. After completing the discharge detection error process of S89, the controller 51 ends the discharge checking process.

The pre-discharge determination process of S82 and the discharge determination process of S86 are examples of the abnormality determination process for determining whether an abnormality was detected in a replaceable part (the drum cartridge 20 in this case).

Figure 13:
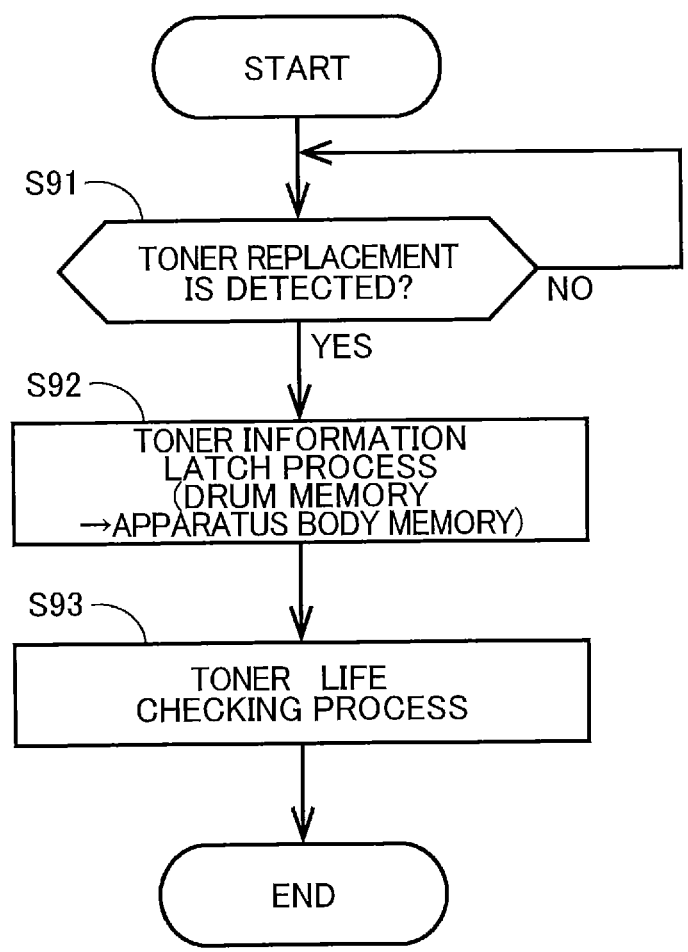
FIG. 13 is a flowchart illustrating steps in a toner checking process when a toner cartridge is replaced in the image forming apparatus.

FIG. 13 illustrates steps in a toner checking process executed when a toner cartridge 30 is replaced in the image forming apparatus 1. Unless otherwise specified, each step in FIG. 13 is executed by the controller 51 of the image forming apparatus 1.

In S91 at the beginning of the toner checking process, the controller 51 executes a process to determine whether a toner cartridge 30 has been replaced. Specifically, when the power to the image forming apparatus 1 was switched from off to on or when the cover sensor 12 detected that the cover 11 was moved from the open position to the closed position, the controller 51 compares the toner ID of each toner cartridge 30 to the corresponding toner ID currently stored in the apparatus body memory 513. The controller 51 determines that a toner cartridge 30 was not replaced when the toner IDs match (S91: NO) and determines that a toner cartridge 30 was replaced if any of the corresponding toner IDs do not match (S91: YES).

If the controller 51 determines in S91 that a toner cartridge 30 was replaced, in S92 the controller 51 executes a toner information latch process. In this process, the controller 51 reads the toner ID and toner life information stored in the corresponding toner memory 32 and writes this information to the apparatus body memory 513. The toner information latch process of S92 is an example of the process to store toner life information.

In S93 the controller 51 executes a toner life checking process. This process includes a toner life determination process for determining whether the toner life information exceeds a prescribed threshold. The prescribed threshold may be a value representing the state of a toner cartridge 30 that needs replacing, for example. If the controller 51 determines that the toner life information does not exceed the prescribed threshold, the controller 51 ends the toner life checking process of S93 (and hence the toner checking process of FIG. 13). However, if the controller 51 determines that the toner life information exceeds the prescribed threshold, the controller 51 determines that the toner cartridge 30 has reached the end of operational life and performs a process to display a screen on the display 55 prompting the user to replace the toner cartridge 30, for example.

2. Second Embodiment

Next, a second embodiment of the present invention will be described. In the following description, parts and steps fulfilling the same functions as those described in the first embodiment will be designated with the same reference numbers and the same step numbers with an appended alphabetic character to avoid duplication description.

In the image forming system 100 according to the first embodiment, the image forming apparatus 1 determines whether the drum cartridge 20 is in an order needed state, as described in FIG. 11. However, the controller 51 of a contracted image forming apparatus 1 need not determine whether the drum cartridge 20 is in an order needed state.

Figure 14:
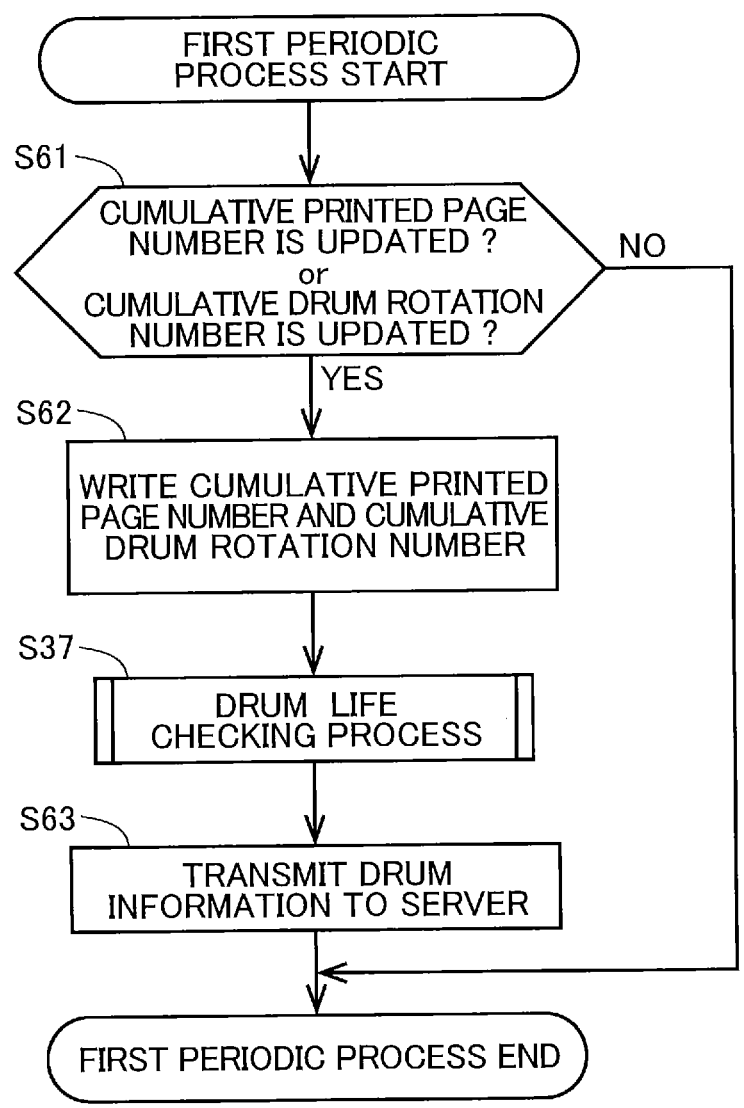
FIG. 14 is a flowchart illustrating steps in a first periodic process executed on a contracted image forming apparatus according to a second embodiment.

FIG. 14 illustrates steps in a first periodic process executed on the contracted image forming apparatus 1 according to the second embodiment. The first periodic process executed on the contracted image forming apparatus 1 according to the second embodiment is similar to the process described in the first embodiment. However, after the controller 51 completes the drum life checking process in S37, the controller 51 executes a drum information transmission process in S63. In this process, the controller 51 transmits drum information stored in the apparatus body memory 513 to the server 7. In addition, the controller 51 transmits drum history information and device information for the contracted image forming apparatus 1 to the server 7. In other words, the controller 51 transmits the device information and drum information to the server 7 in a correlated state. After completing the drum information transmission process of S63, the controller 51 ends the first periodic process. Note that the process of S63 need not be executed on a normal image forming apparatus 1. That is, when set to the normal mode, the controller 51 executes the first periodic process described in FIG. 10.

Figure 15:
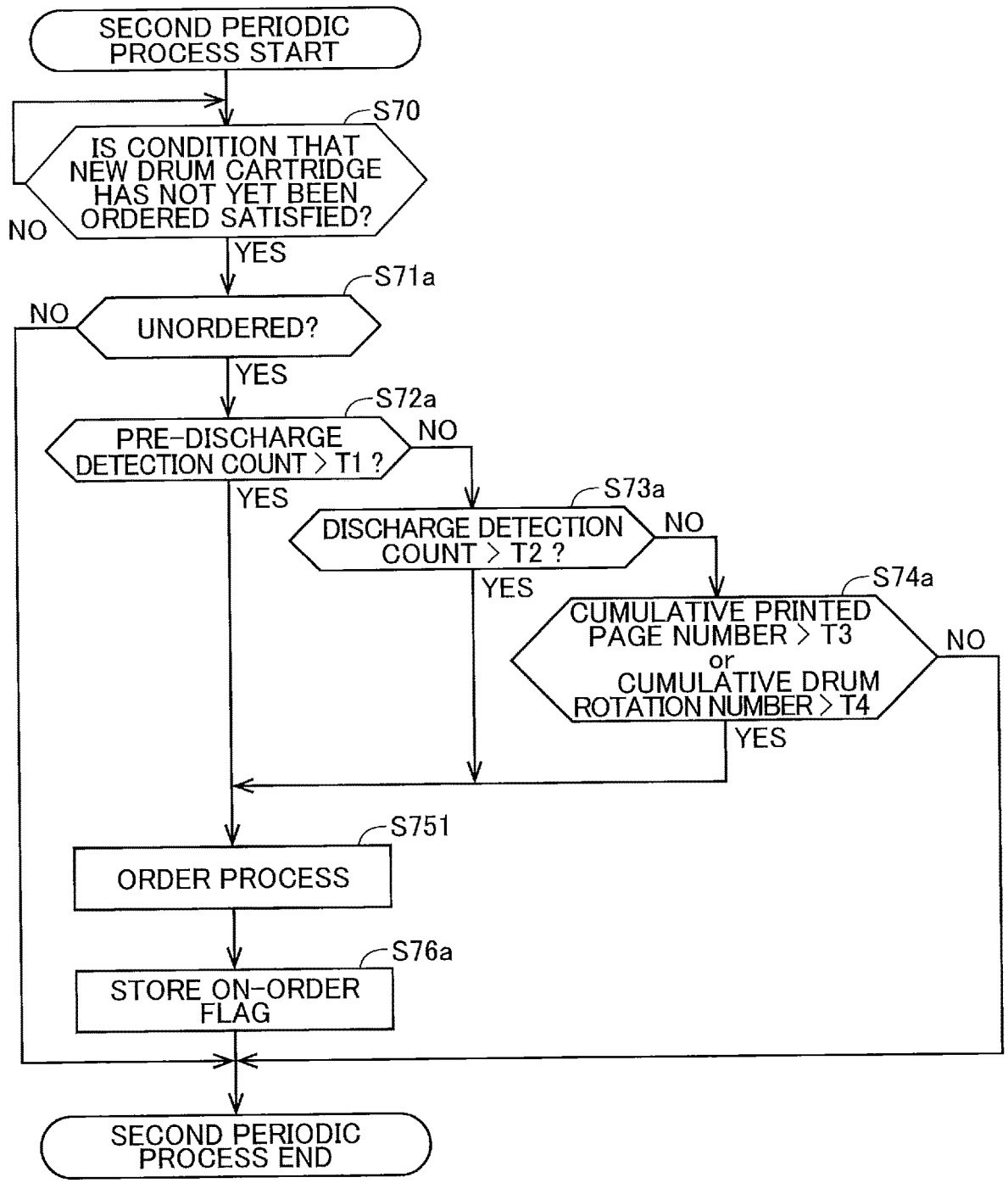
FIG. 15 is a flowchart illustrating steps in a second periodic process executed on a server according to the second embodiment.

FIG. 15 illustrates steps in a second periodic process executed on the server 7 according to the second embodiment. The second periodic process shown in FIG. 15 is similar in part to the second periodic process described in FIG. 11. However, the processes differ in that the second periodic process in FIG. 11 is executed by the image forming apparatus 1, while the second periodic process in FIG. 15 is executed by the server 7.

In S70 the server 7 according to the second embodiment determines whether drum information and device information were received. The drum information and device information are information that the image forming apparatus 1 transmitted in S63 of FIG. 14. The server 7 repeats the process in S70 while such information has not been received (S70: NO). If the server 7 receives drum information and device information (S70: YES), in S71a the server 7 executes an order determination process. In this process, the control unit 71 determines whether a condition that a new drum cartridge 20 has not yet been ordered based on the drum information received from the image forming apparatus 1 is satisfied.

When the server 7 orders a new drum cartridge 20 in an on-order flag process described later in S76a, the server 7 saves an on-order flag in the registration information 731 in association with the corresponding drum ID. Hence, in the order determination process of S71a, the server 7 confirms whether an on-order flag has been saved in the registration information 731 in association with the drum ID in the received drum information. If the server 7 determines that the condition that a new drum cartridge 20 was ordered is satisfied (S71a: NO), the server 7 ends the second periodic process. However, if the server 7 determines that a new drum cartridge 20 has not yet been ordered is not satisfied (S71a: YES), the server 7 advances to S72a.

Steps S72a, S73a, and S74a in the second periodic process are performed to determine whether the drum cartridge 20 is in an order needed state and, except being executed by the server 7, are identical to steps S72, S73, and S74 described in FIG. 11. In other words, the server 7 determines whether the pre-discharge detection count exceeds the threshold T1 (S72a), whether the discharge detection count exceeds the threshold T2 (S73a), and whether the cumulative printed page number exceeds the threshold T3 or the cumulative drum rotation number exceeds the threshold T4 (S74a).

If the server 7 determines in one of steps S72a, S73a, and S74a that the drum cartridge 20 is in an order needed state (S72a: YES, S73a: YES), or S74a: YES), the server 7 advances to S751 to perform the order process. However, if the server 7 determines in S72a, S73a, and S74a that the drum cartridge 20 is not in an order needed state (S72a, S73a, and S74a: NO), the server 7 ends the second periodic process.

As illustrated in FIG. 5, the server 7 transmits order information to the server 9 of the shipping company in the order process of S751. As shown in FIG. 5, the shipping company ships a new drum cartridge 20 to the contracted user specified in the order information received via the server 9 (shipping process S752). Through this process, the contracted user can receive a new drum cartridge 20 before the drum cartridge 20 mounted in the contracted image forming apparatus 1 reaches the replacement needed state.

Returning to FIG. 15, after completing the order process in S751, the controller 51 executes the on-order flag process in S76a. As described above, in this process the server 7 saves an on-order flag in the registration information 731 with the drum ID associated with the order.

In the second embodiment described above, the controller 51 of the image forming apparatus 1 transmits drum information to the server 7 in S63 of FIG. 14, and the server 7 determines whether to order a new drum cartridge 20. Thus, drum information transmitted to the server 7 in S63 is an example of order information for ordering a new drum cartridge 20. Further, the drum information transmission process of S63 is an example of the transmission process by which the controller 51 sends order information to the server 7.

3. Third Embodiment

FIG. 16 is a table showing details of control stipulated for drum cartridges based on the operating mode of the image forming apparatus and the drum type information according to a third embodiment. As shown in FIG. 16, the image forming system 100 according to the third embodiment performs the process to restrict extended use of the drum cartridge 20 regardless of type of the drum cartridge 20 when the operating mode of the controller 51 is set to the high-cost subscription mode for the following reason. Foreign matter may become deposited on the surface of the photosensitive drums 21 when the drum cartridge 20 has been used for a long period of time, for example, resulting in a decline in printing quality. Therefore, when the controller 51 is set to a specific operating mode, such as the high-cost subscription mode, the controller 51 performs the process to restrict extended use of the drum cartridge 20 past its expected lifespan, regardless of the type of drum cartridge 20, thereby preventing a decline in image quality caused by deposited foreign matter or the like.

4. Fourth Embodiment

Figure 17:
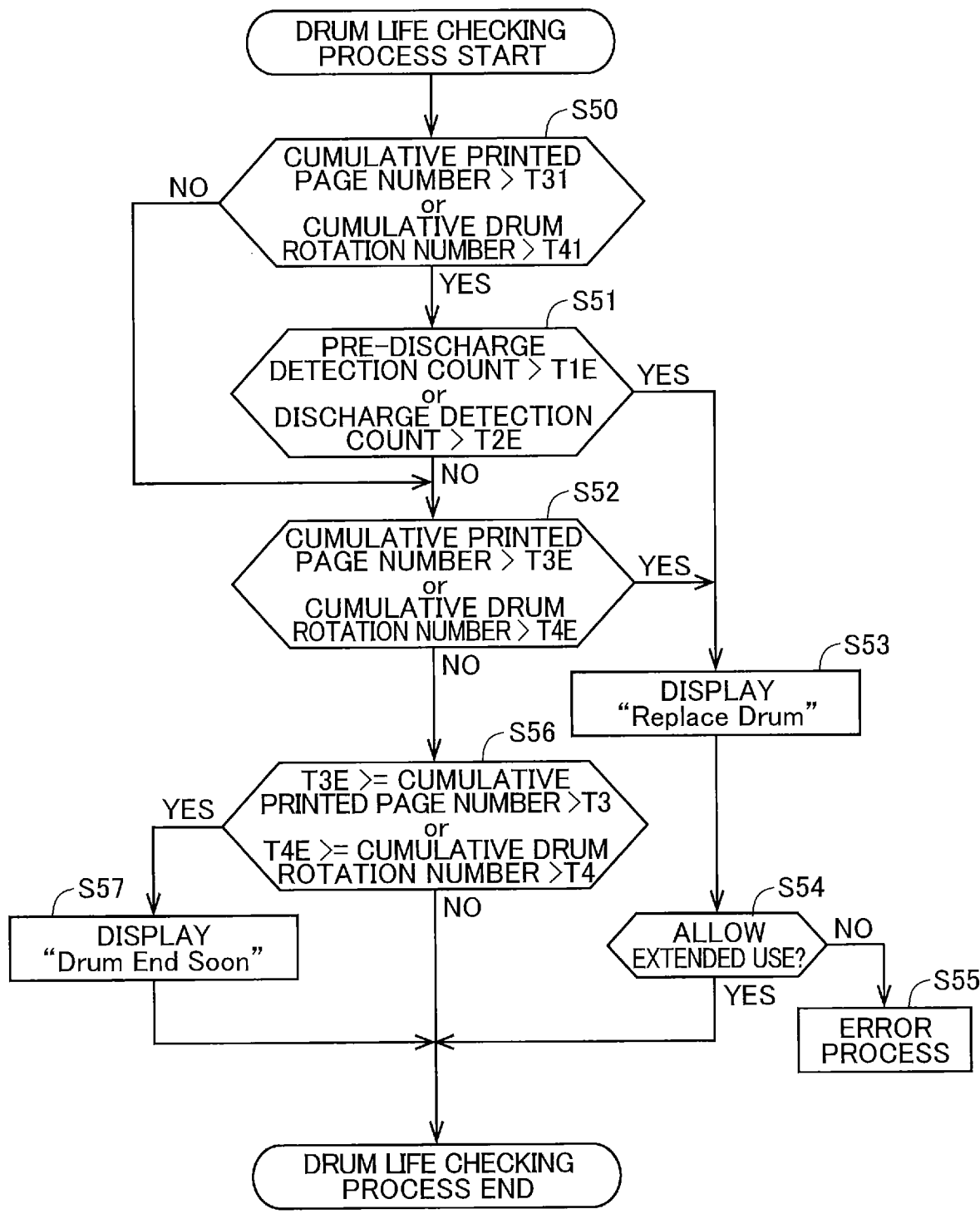
FIG. 17 is a flowchart illustrating steps in a drum life checking process according to a fourth embodiment.

FIG. 17 illustrates steps in a drum life checking process according to a fourth embodiment. The drum life checking process according to the fourth embodiment differs from the process shown in FIG. 9 in that the determination process of S50 is added before the determination process of S51. In S50 the controller 51 determines whether the drum cartridge 20 is in a check needed state based on the drum life information. The check needed state is a state that occurs earlier than the replacement needed state in which the discharge history information must be checked.

In S50 the controller 51 determines whether the cumulative printed page number in the drum life information exceeds a prescribed threshold T31 representing a check needed state and whether the cumulative drum rotation number in the drum life information exceeds a threshold T41 representing a check needed state. Here, the prescribed threshold T31 may be identical to the threshold T3 or T3E representing an order needed state, and the threshold T41 may be identical to the threshold T4 or the T4E representing an order needed state.

If the controller 51 determines in S50 that the cumulative printed page number exceeds the prescribed threshold T31 or that the cumulative drum rotation number exceeds the threshold T41 (S50: YES), the controller 51 advances to S51 described in the first embodiment. However, if the controller 51 determines that the cumulative printed page number does not exceed the prescribed threshold T31 and that the cumulative drum rotation number does not exceed the threshold T41 (S50: NO), the controller 51 skips S51 and advances to S52. Accordingly, the controller 51 may determine based on the life information for the drum cartridge 20 whether to perform the determination in S51 for checking the discharge history information.

5. Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

For example, the charger 23 need not be a scorotron-type charger but may be a charging roller or a charger of another type.

As described with reference to FIG. 8, the controller 51 can switch the type of control for controlling extended usage of the drum cartridge 20 (and specifically control allowing extended use and control restricting extended use) based on the operating mode and the drum type information. However, the controller 51 need not switch control for extended use of the drum cartridge 20 based on the drum type information. In this case, the controller 51 may switch control of extended usage based solely on the operating mode. Specifically, the controller 51 may perform control to restrict extended use when the operating mode is set to the subscription mode and to allow extended use when the operating mode is set to the normal mode. Alternatively, the controller 51 need not switch the control for extended usage based on the operating mode. In this case, the controller 51 may switch control of extended usage based solely on the drum type information.

The server 7 is an example of the communication device, but the communication device is not limited to the server 7 described in the embodiments. The communication device may be a personal computer, smartphone, tablet computer, or other information terminal. The controller 51 of the image forming apparatus 1 may transmit order information (including drum information and the like in the second embodiment) to the information terminal. In this case, the information terminal may transmit the order information to the server 7. Further, e-mail may be used to perform data communications among devices.

While the image forming apparatus 1 is configured as a color printer in the embodiment and is provided with toner cartridges 30 for a plurality of colors, the image forming apparatus 1 may instead be a monochromatic printer. In this case, the image forming apparatus is provided with a drum cartridge having a single photosensitive drum 21 to correspond to the single toner cartridge 30.

Figure 18:
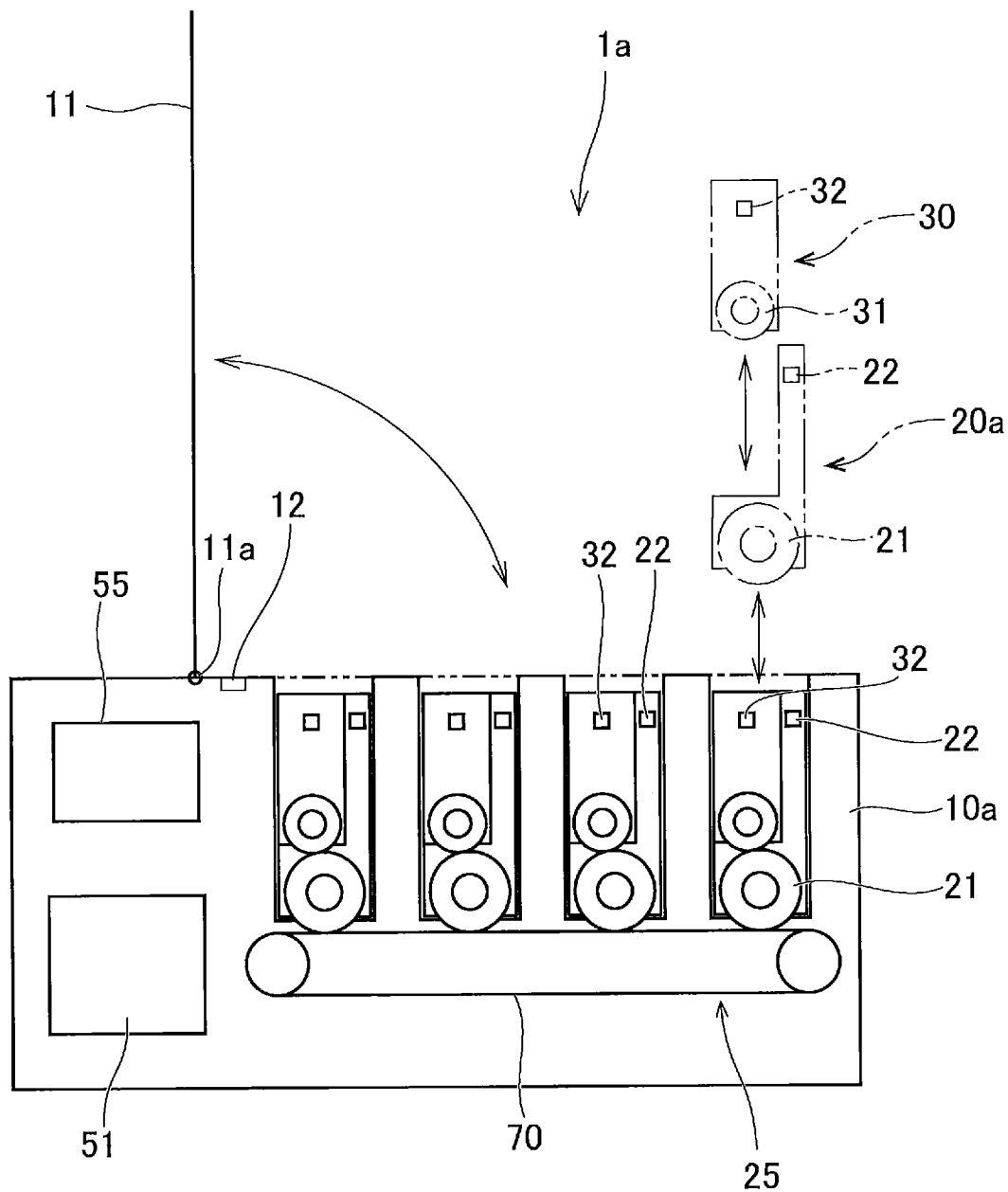
FIG. 18 is a schematic diagram illustrating an image forming apparatus according to a variation of the first through fourth embodiments.

Further, the drum cartridge 20 provided in a color image forming apparatus need not be configured to retain all four toner cartridges 30. FIG. 18 is a schematic diagram showing an image forming apparatus 1a according to a variation of the embodiment. The image forming apparatus 1a is provided with a main casing 10a. Four drum cartridges 20a are replaceably mounted in the main casing 10a. Each drum cartridges 20a has one each of a photosensitive drum 21 and drum memory 22. A single toner cartridge 30 is replaceably mounted in each drum cartridges 20a. The image forming apparatus 1a may also be applied to the image forming system 100 shown in FIG. 1.

Note that while the toner cartridge 30 is provided with the developing roller 31 in the embodiment, the developing roller 31 may be provided in the drum cartridge 20 instead. Alternatively, a developing cartridge including the developing roller 31 may be provided in addition to the toner cartridge 30 without the developing roller and the drum cartridge 20, configuring a three-cartridge system. In this case, the developing cartridge is mountable in the drum cartridge 20, and the toner cartridge 30 is mountable in the drum cartridge 20.

In the embodiment, the drum cartridge 20 is described as a replaceable part that can be mounted in the main casing 10 and that is used together with the toner cartridges 30 for image formation, but the replaceable part is not limited to the drum cartridge 20. The replaceable part may be the transfer unit 40 or the light source units, for example.

While the description has been made in detail with reference to the embodiments thereof, the description is exemplary in all aspects and the present disclosure is not limited thereto. It would be apparent to those skilled in the art that many modifications and variations may be made therein without departing from the spirit of the disclosure. Further, parts and components appearing in the embodiments and modifications may be suitably combined together and omitted as long as any conflicting structure is avoidable.

What is claimed is:

1. An image forming apparatus comprising:
   an apparatus body;
   a toner cartridge detachably attachable to the apparatus body;
   a replaceable part detachably attachable to the apparatus body and for use with the toner cartridge in an image-formation;
   a controller, whose operating mode is set to one of a subscription mode and a normal mode, the controller being configured to perform processes in accordance with the set operating mode; and
   an apparatus body memory configured to store life information indicating a remaining life of the replaceable part attached to the apparatus body,
   wherein the controller is configured to switch a control between: a control for allowing an extended use of the replaceable part; and a control for restricting the extended use of the replaceable part, according to the set operating mode, the extended use being defined as use of the replaceable part even after the replaceable part exceeds the remaining life indicated by the life information stored in the apparatus body memory.

2. The image forming apparatus according to claim 1, wherein the controller is configured to:
   allow the extended use of the replaceable part in a case where the operating mode is set to the normal mode; and
   restrict the extended use of the replaceable part in a case where the operating mode is set to the subscription mode.

3. The image forming apparatus according to claim 1, wherein the toner cartridge comprises:
   a casing accommodating toner therein; and
   a toner memory storing therein toner type information indicating one of a subscribed toner cartridge and a normal toner cartridge, and
   wherein the controller is configured to restrict the extended use of the toner cartridge in a case where the operating mode is set to the normal mode and the toner cartridge is a subscribed toner cartridge.

4. The image forming apparatus according to claim 1, wherein the controller is further configured to:
   update the life information stored in the apparatus body memory in accordance with use of the replaceable part;
   determine whether the updated life information exceeds a first threshold value, the first threshold value indicating an end state of the replaceable part, in which the replaceable part should be replaced; and
   in a case where the controller determines that the updated life information exceeds the first threshold value, switch control between: the control of allowing the extended use of the replaceable part; and the control of restricting the extended use of the replaceable part, according to the set operating mode.

5. The image forming apparatus according to claim 4, further comprising a display configured to display images,
   wherein, in a case where the controller restricts the extended use of the replaceable part, the controller is further configured to display, on the display, an image indicating that the replaceable part should be replaced, and prohibit use of the replaceable part attached to the apparatus body.

6. The image forming apparatus according to claim 1, further comprising a communication interface configured to be controlled and used by the controller to communicate with a communication device via a network,
   wherein, in a case where the controller restricts the extended use of the replaceable part, the controller further configured to control the communication interface to transmit order information to the communication device to order a new replaceable part based on the life information.

7. The image forming apparatus according to claim 6, wherein the controller is further configured to:
   determine whether the life information exceeds a second threshold value, the second threshold value indicating a near-end state, the replaceable part reaching the near-end state before the replaceable part reaches the end state; and
   in a state where the controller determines that the life information exceeds the second threshold value and restricts the extended use of the replaceable part, transmit the order information to the communication device.

8. The image forming apparatus according to claim 1, wherein the replaceable part includes a drum cartridge including a photosensitive drum.

9. The image forming apparatus according to claim 1, wherein the replaceable part includes a transfer unit configured to transfer toner deposited on a photosensitive drum to a base material.

10. The image forming apparatus according to claim 1, wherein the toner cartridge includes a toner memory storing toner life information indicating remaining life of the toner cartridge,
wherein the controller is further configured to:
determine whether the toner cartridge is replaced;
in a case where the controller determines that the toner cartridge is replaced, store, in the apparatus body memory, the toner life information stored in the toner memory; and
determine whether the toner life information exceeds a predetermined threshold value.

11. An image forming apparatus comprising:
an apparatus body;
a toner cartridge detachably attachable to the apparatus body;
a replaceable part detachably attachable to the apparatus body and for use with the toner cartridge in an image-formation, the replaceable part including a replaceable part memory storing therein replaceable part type information indicating one of a subscribed replaceable part and a normal replaceable part;
a controller; and
an apparatus body memory storing life information indicating remaining life of the replaceable part attached to the apparatus body,
wherein the controller is configured to switch a control between: a control for allowing an extended use of the replaceable part; and a control for restricting the extended use of the replaceable part, according to the replaceable part type information, the extended use being defined as use of the replaceable part even after the replaceable part exceeds the remaining life indicated by the life information stored in the apparatus body memory.

12. The image forming apparatus according to claim 11, wherein the controller is configured to:
allow the extended use of the replaceable part in a case where the replaceable part type information indicates that the replaceable part is a normal replaceable part; and
restrict the extended use of the replaceable part in a case where the replaceable part type information indicates that the replaceable part is a subscribed replaceable part.

13. The image forming apparatus according to claim 11, wherein the controller is further configured to:
determine whether replacement of the replaceable part is detected; and
in a case where the controller determines that the replaceable part is replaced, read the replaceable part type information stored in the replaceable part memory.

14. The image forming apparatus according to claim 11, wherein the subscribed replaceable part is less expensive than the normal replaceable part.

15. The image forming apparatus according to claim 11, wherein the subscribed replaceable part is less durable than the normal replaceable part.

16. An image forming system comprising:
an image forming apparatus; and
a communication device configured to communicate with the image forming apparatus via a network,
the image forming apparatus comprising:
an apparatus body;
a toner cartridge detachably attachable to the apparatus body;
a replaceable part detachably attachable to the apparatus body and for use with the toner cartridge in an image-formation;
a controller, whose operating mode is set to one of a subscription mode and a normal mode, the controller being configured to perform processes in accordance with the set operating mode; and
an apparatus body memory configured to store life information indicating a remaining life of the replaceable part attached to the apparatus body,
wherein the controller is configured to:
switch a control between: a control for allowing an extended use of the replaceable part; and a control for restricting the extended use of the replaceable part, according to the set operating mode, the extended use being defined as use of the replaceable part even after the replaceable part exceeds the remaining life indicated by the life information stored in the apparatus body memory; and
in a case where the controller restricts the extended use of the replaceable part, transmit order information to the communication device to order a new replaceable part based on the life information.

17. A method for controlling an image forming apparatus, the image forming apparatus comprising a toner cartridge and a replaceable part for use with the toner cartridge in an image-formation, an operating mode of the image forming apparatus being set to one of a subscription mode and a normal mode,
the method comprising:
storing, in an apparatus body memory, life information indicating remaining life of the replaceable part attached to the apparatus body; and
switching a control between: a control for allowing an extended use of the replaceable part; and a control for restricting the extended use of the replaceable part, according to the set operating mode, the extended use being defined as use of the replaceable part even after the replaceable part exceeds the remaining life indicated by the life information stored in the apparatus body memory.

18. A method for controlling an image forming apparatus, the image forming apparatus comprising a toner cartridge and a replaceable part for use with the toner cartridge in an image-formation, replaceable part type information being previously assigned to the replaceable part, the replaceable part type information indicating one of a subscribed replaceable part and a normal replaceable part,
the method comprising:
storing, in an apparatus body memory, life information indicating remaining life of the replaceable part attached to the apparatus body; and
switching a control between: a control for allowing an extended use of the replaceable part; and a control for restricting the extended use of the replaceable part, according to the replaceable part type information, the extended use being defined as use of the replaceable part even after the replaceable part exceeds the remaining life indicated by the life information stored in the apparatus body memory.

19. A non-transitory storage medium storing a set of program instructions installed on and executed by a computer for controlling an image forming apparatus, an operating mode of the image forming apparatus being set to one of a subscription mode and a normal mode, the set of program instructions comprising:
storing, in an apparatus body memory, life information indicating remaining life of the replaceable part attached to the apparatus body; and
switching a control between: a control for allowing an extended use of the replaceable part; and a control for restricting the extended use of the replaceable part, according to the set operating mode, the extended use being defined as use of the replaceable part even after the replaceable part exceeds the remaining life indicated by the life information stored in the apparatus body memory.

20. A non-transitory storage medium storing a set of program instructions installed on and executed by a computer for controlling an image forming apparatus, replaceable part type information being previously assigned to the replaceable part, the replaceable part type information indicating one of a subscribed replaceable part and a normal replaceable part, the set of program instructions comprising:
storing, in an apparatus body memory, life information which indicating remaining life of the replaceable part attached to the apparatus body; and
switching a control between: a control for allowing an extended use of the replaceable part; and a control for restricting the extended use of the replaceable part, according to the replaceable part type information, the extended use being defined as use of the replaceable part even after the replaceable part exceeds the remaining life indicated by the life information stored in the apparatus body memory.

* * * * *